(12) United States Patent
Minami et al.

(10) Patent No.: US 7,379,475 B2
(45) Date of Patent: May 27, 2008

(54) COMMUNICATIONS PROCESSOR

(75) Inventors: John Shigeto Minami, Honolulu, HI (US); Michael Ward Johnson, Livermore, CA (US)

(73) Assignee: NVIDIA Corporation, Santa Clara, CA (US)

( * ) Notice: Subject to any disclaimer, the term of this patent is extended or adjusted under 35 U.S.C. 154(b) by 850 days.

(21) Appl. No.: 10/470,365

(22) PCT Filed: Jan. 25, 2002

(86) PCT No.: PCT/US02/02293

§ 371 (c)(1),
(2), (4) Date: Jul. 25, 2003

(87) PCT Pub. No.: WO02/059757

PCT Pub. Date: Aug. 1, 2002

(65) Prior Publication Data

US 2004/0081202 A1    Apr. 29, 2004

(51) Int. Cl.
*H04J 3/16* (2006.01)
*H04J 3/22* (2006.01)
*H04J 3/24* (2006.01)
*G06F 15/16* (2006.01)

(52) U.S. Cl. .................. 370/469; 370/474; 709/250
(58) Field of Classification Search ............ None
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,289,580 A | 2/1994 | Latif et al. | |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |

(Continued)

FOREIGN PATENT DOCUMENTS

AU    4595297    5/1998

(Continued)

OTHER PUBLICATIONS

Written Opinion from PCT/US02/02293.

(Continued)

*Primary Examiner*—Ronald Abelson
(74) *Attorney, Agent, or Firm*—Zilka-Kotab, P.C.

(57) ABSTRACT

A communication processor of a class, such as an Internet tuner, provides such desirable features (FIG. 2) as LAN support, an SPI interface (128), a dedicated port (56), and ADPCM (22) for audio applications. The invention provides a low-cost, low-power, easily manufactured, small form-factor network access module which has a low memory demand and provides a highly efficient protocol decode. The invention comprises a hardware-integrated system that both decodes multiple network protocols in a streaming manner concurrently and processes packet data in one pass, thereby reducing system memory and form factor requirements, while also eliminating software CPU overhead.

62 Claims, 8 Drawing Sheets

U.S. PATENT DOCUMENTS

| | | | |
|---|---|---|---|
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,671,355 A | 9/1997 | Collins | |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A * | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,568 B1 * | 2/2001 | Douceur et al. | 707/10 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher | 709/243 |
| 6,389,537 B1 | 5/2002 | Davis et al. | 713/187 |
| 6,393,456 B1 * | 5/2002 | Ambler et al. | 709/200 |
| 6,393,487 B2 | 5/2002 | Boucher | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Connor | 710/5 |
| 6,434,620 B1 | 8/2002 | Boucher | 709/230 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 | 2/2006 | Starr | 370/252 |
| 7,042,898 B2 | 5/2006 | Blightman | 370/463 |
| 2001/0021949 A1 | 9/2001 | Blightman | 709/219 |
| 2001/0023460 A1 | 9/2001 | Boucher | 709/250 |
| 2001/0027496 A1 | 10/2001 | Boucher | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher | 709/250 |
| 2002/0091844 A1 | 7/2002 | Craft | 709/230 |
| 2002/0095519 A1 | 7/2002 | Philbrick | 709/250 |

| | | | | | | |
|---|---|---|---|---|---|---|
| 2002/0107971 | A1 | 8/2002 | Bailey et al. ............... 709/231 | CN | 1237295 A | 12/1999 |
| 2002/0108059 | A1 | 8/2002 | Canion et al. .............. 713/201 | CN | 1266512 T | 9/2000 |
| 2002/0120899 | A1 | 8/2002 | Gahan et al. ............... 714/748 | CN | 1305681 T | 7/2001 |
| 2002/0147839 | A1 | 10/2002 | Boucher ...................... 709/238 | TW | 447205 B | 7/2001 |
| 2002/0156927 | A1 | 10/2002 | Boucher ...................... 709/250 | TW | 448407 B | 8/2001 |
| 2002/0161919 | A1* | 10/2002 | Boucher et al. ............ 709/238 | WO | WO98/21655 | 5/1998 |
| 2002/0163888 | A1 | 11/2002 | Grinfeld ..................... 370/235 | WO | WO98/50852 | 11/1998 |
| 2003/0005142 | A1 | 1/2003 | Elzur et al. ................. 709/232 | WO | WO 98/50852 | 11/1998 |
| 2003/0005143 | A1 | 1/2003 | Elzur et al. ................. 709/232 | WO | WO 99/65219 | 12/1999 |
| 2003/0014544 | A1 | 1/2003 | Pettey ........................ 709/249 | WO | WO00/13091 A1 | 3/2000 |
| 2003/0016669 | A1 | 1/2003 | Pfister et al. ............... 370/392 | WO | WO 01/13583 | 2/2001 |
| 2003/0031172 | A1 | 2/2003 | Grinfeld ..................... 370/389 | WO | WO 01/28179 | 4/2001 |
| 2003/0046330 | A1 | 3/2003 | Hayes ........................ 709/201 | WO | WO 02/39263 | 5/2002 |
| 2003/0046418 | A1 | 3/2003 | Raval et al. ................ 709/237 | WO | WO 02/39276 | 5/2002 |
| 2003/0056009 | A1 | 3/2003 | Mizrachi et al. ........... 709/245 | WO | WO 02/39301 | 5/2002 |
| 2003/0058870 | A1 | 3/2003 | Mizrachi et al. ....... 370/395.52 | WO | WO 02/39302 | 5/2002 |
| 2003/0061505 | A1 | 3/2003 | Sperry et al. ............... 713/200 | WO | WO 02/059757 | 8/2002 |
| 2003/0066011 | A1 | 4/2003 | Oren ......................... 714/758 | WO | WO 02/069604 | 9/2002 |
| 2003/0079033 | A1 | 4/2003 | Craft .......................... 709/230 | WO | WO 02/086674 | 10/2002 |
| 2003/0084185 | A1 | 5/2003 | Pinkerton ................... 709/236 | WO | WO 03/021436 | 3/2003 |
| 2003/0095567 | A1 | 5/2003 | Lo et al. ..................... 370/466 | WO | WO 03/021443 | 3/2003 |
| 2003/0115350 | A1 | 6/2003 | Uzrad-Nali et al. ........ 709/231 | WO | WO 03/021447 | 3/2003 |
| 2003/0115417 | A1 | 6/2003 | Corrigan .................... 711/118 | WO | WO 03/021452 | 3/2003 |
| 2003/0128704 | A1 | 7/2003 | Mizrachi et al. ........... 370/394 | | | |
| 2003/0140124 | A1 | 7/2003 | Burns ......................... 709/220 | | | |
| 2003/0145101 | A1 | 7/2003 | Mitchell et al. ............ 709/236 | | | |
| 2003/0145270 | A1 | 7/2003 | Holt ........................... 714/766 | | | |
| 2003/0158906 | A1 | 8/2003 | Hayes ........................ 709/211 | | | |
| 2003/0167346 | A1 | 9/2003 | Craft .......................... 709/250 | | | |
| 2003/0200284 | A1 | 10/2003 | Philbrick ................... 709/219 | | | |
| 2003/0236837 | A1 | 12/2003 | Johnson et al. ............ 709/205 | | | |
| 2003/0236919 | A1 | 12/2003 | Johnson et al. ............ 709/251 | | | |
| 2004/0003126 | A1 | 1/2004 | Boucher ..................... 709/250 | | | |
| 2004/0054813 | A1 | 3/2004 | Boucher ..................... 709/250 | | | |
| 2004/0062245 | A1 | 4/2004 | Sharp ......................... 370/392 | | | |
| 2004/0062246 | A1 | 4/2004 | Boucher ..................... 370/392 | | | |
| 2004/0064578 | A1 | 4/2004 | Boucher ..................... 709/236 | | | |
| 2004/0064589 | A1 | 4/2004 | Boucher ..................... 709/250 | | | |
| 2004/0064590 | A1 | 4/2004 | Starr .......................... 709/250 | | | |
| 2004/0073703 | A1 | 4/2004 | Boucher ..................... 709/245 | | | |
| 2004/0078462 | A1 | 4/2004 | Philbrick ................... 709/224 | | | |
| 2004/0088262 | A1 | 5/2004 | Boucher ..................... 705/65 | | | |
| 2004/0100952 | A1 | 5/2004 | Boucher ..................... 370/389 | | | |
| 2004/0111535 | A1 | 6/2004 | Boucher ..................... 709/250 | | | |
| 2004/0117509 | A1 | 6/2004 | Craft .......................... 709/250 | | | |
| 2004/0158640 | A1 | 8/2004 | Philbrick ................... 709/230 | | | |
| 2004/0158793 | A1 | 8/2004 | Blightman ................. 714/758 | | | |
| 2004/0213290 | A1* | 10/2004 | Johnson et al. ............ 370/469 | | | |
| 2004/0240435 | A1 | 12/2004 | Boucher ..................... 370/352 | | | |
| 2005/0122986 | A1 | 6/2005 | Starr .......................... 370/412 | | | |
| 2005/0141561 | A1 | 6/2005 | Craft .......................... 370/474 | | | |
| 2005/0160139 | A1 | 7/2005 | Boucher ..................... 709/203 | | | |
| 2005/0175003 | A1 | 8/2005 | Craft .......................... 370/389 | | | |
| 2005/0182841 | A1 | 8/2005 | Starr .......................... 709/228 | | | |
| 2005/0198198 | A1 | 9/2005 | Craft .......................... 709/217 | | | |
| 2005/0204058 | A1 | 9/2005 | Philbrick ................... 709/238 | | | |
| 2005/0278459 | A1 | 12/2005 | Boucher ..................... 709/250 | | | |
| 2006/0010238 | A1 | 1/2006 | Craft .......................... 709/227 | | | |
| 2007/0062245 | A1 | 3/2007 | Fuller et al. ................. 72/413 | | | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |

OTHER PUBLICATIONS

Muller, Raimund, LON-das universelle Netzwerk Elektronik 22-1991.

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate To Silicon For Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/en981112-1/en981112-1.html, Nov. 1998.

iReady Product Data Sheet, Internet Tuner.

Johnson et al. , "Internet Tuner", New Media News, http://www.newmedianews.com/020197/ts.sub- inettuner,html. Jan. 1997.

Kelly, T., "Cheap Internet Hardware that Fits in Everything", ZDNet, http://www.zdnet.co.uk/news/1998/44/ns-5998.html, Nov. 1998.

8802-3:2000 ISO/IEC Information Technology, http://www.computer.org/cspress/CATALOG/st01118.htm.

INCITS: Development work conducted in t10-I/O Interface-Lower Level Sep. 30, 2002 Weber, Ralph O.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Muller, Raimund, "LON—das universelle Netzwerk" Elektronik 22/1991.

Rang, Michael; Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1 Feb. 1997.

Doumenis, Gr.A., Konstantoulakis, G.E., Reisis, D.I.and Stassinopoulous, G.I. "A Pérsonal Computer Hosted Terminal Adapter For The Broadband Integrated Services Digital Network and Applications" National Technical University of Athens, Greece.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization For A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Syatems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High-Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver Co, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Orgination of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "high-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David "Intetnet Protocols Migrate to Silicon For Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Networking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www. newmedianews.com/02197/ts_inettuner. html.

Kelly, T. "Cheap Internet Hardware that Fits in Everything" ZDNET, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

eady Product Data Sheet, Internet Tuner.

Luijten, Ronald P., "An OC-12 ATM Switch Adapter Chipset" 1998 IEEE.

"Less-Numerical Algoritms", Ch. 20 p. 888-895.

"Storage Networking Industry Association" iSCSI Building Blocks for IP Storage Networking, www.ipstorage.org.

R. Droms, Dynamic Host Configuration Protocol, Network Working Group- www.ieft.org/rfc/rfc2131.txt?number=2131, Mar. 1997.

D. Plummer, An Ethernet Resolution Prootocol, Network Working Group- www.ieft.org/rfc/rfc0826.txt?number=0826, Nov. 1982.

Finlayson et al., A reverse address resolution protocol, Network Working Group- www.ieft.org/rfc/rfc0903.txt?number=0903, Jun. 1984.

N. Borenstein, et al., MIME (multipurpose internt mail extensions): mechanisms for specifying and describing the format of internet message bodies, Network Working Group- www.ieft.org/rfc/rfc1341.txt?number1341, Jun. 1992.

Mansour, et al., fpga-based internet protocol version 6 router, Dept. of Electrical and Computer Engineering, American University of Beirut, IEEE Transaction on Communications. vol. 42, No. 8, Aug. 1994.

Krishnakumar et al., vlsi implementations of communication protocols—a survey, IEEE Journal on selected areas in communications, vol. 7., No. 7, Sep. 1989.

McCanny et al., hierarchial vhdl libraries for dsp asic design, IEEE 1997.

Krishnakumar et al., The programmable protocol VLSI engine (PROVE), IEEE transactions on communications, vol. 42, No. 8, Aug. 1994.

Written Opinion from PCT/US02/02293, no update.

Nielson, Dr. Michael J.K., "TURBOchannel" IEEE 1991.

Eady Product Data Sheet, Internet Tuner, no update.

"Less-Numerical Algorithms", Ch. 20 p. 888-895, no update.

Marcus, William S.; Hadzic, Ilija; McAuley, Anthony J.; Smith Jonathan M., "Protocol Boosters: Applying Programmability to Network Infrastructures" IEEE Communications Magazine Oct. 1998.

Varada, S.; Yang, Y.; Evans, D., "Data and Buffer Management in ATM Systems" TranSwitch Corporation, no update.

Bonjour, Dominique; de Hauteclocque, Gaelle; le Moal, Jaques, "Design and Application of ATM LAN/WAN Adapters" IEEE 1998.

Doumenis, Gr.A., Konstantoulakis, G.E., Reisis, D.I.and Stassinopoulos, G.I. "A Pérsonal Computer Hosted Terminal Adapter For The Broadband Integrated Services Digital Network and Applications" National Technical University of Athens, Greece, no update.

iReady Product Data Sheet, Internet Tuner, no update.

* cited by examiner

COMMUNICATIONS PROCESSOR

TECHNICAL FIELD

The invention relates to telecommunications. More particularly, the invention relates to an apparatus and method for processing data in connection with protocols that are used in order to send and receive data, for example email, web documents, digital files, audio, video, or other data in digital format.

DESCRIPTION OF THE PRIOR ART

This section describes the prior art and defines the terms: communications network, network device, protocol, layer, data, frame, data packet, host computer, CPU, ISO, OSI, protocol-processing software (stack).

Communications networks use protocols to transmit and receive data. Typically, a communications network comprises a collection of network devices, also called nodes, such as computers, printers, storage devices, and other computer peripherals, communicatively connected together. Data is transferred between each of these network devices using data packets that are transmitted through the communications network using a protocol. Many different protocols are in current use today. Examples of popular protocols include the Internet Protocol (IP), Internetwork Packet Exchange (IPX) protocol, Sequenced Packet Exchange (SPX) protocol, Transmission Control Protocol (TCP), Point-to-Point Protocol (PPP) and other similar new protocols that are under development. A network device contains a combination of hardware and software that processes protocols and data packets.

In 1978, the International Standards Organization (ISO), a standards setting body, created a network reference model known as the Open System Interconnection (OSI) model. The OSI model includes seven conceptual layers: 1) The Physical (PHY) layer that defines the physical components connecting the network device to the network; 2) The Data Link layer that controls the movement of data in discrete forms known as frames that contain data packets; 3) The Network layer that builds data packets following a specific protocol; 4) The Transport layer that ensures reliable delivery of data packets; 5) The Session layer that allows for two way communications between network devices; 6) The Presentation layer that controls the manner of representing the data and ensures that the data is in correct form; and 7) The Application layer that provides file sharing, message handling, printing and so on. Sometimes the Session and Presentation layers are omitted from this model. For an explanation of how modern communications networks and the Internet relate to the ISO seven-layer model see, for example, chapter 11 of the text "Internetworking with TCP/IP" by Douglas E. Comer (volume 1, fourth edition, ISBN 0201633469) and Chapter 1 of the text "TCP/IP Illustrated" by W. Richard Stevens (volume 1, ISBN 0130183806).

An example of a network device is a computer attached to a Local Area Network (LAN), wherein the network device uses hardware in a host computer to handle the Physical and Data Link layers, and uses software running on the host computer to handle the Network, Transport, Session, Presentation and Application layers. The Network, Transport, Session, and Presentation layers, are implemented using protocol-processing software, also called protocol stacks. The Application layer is implemented using application software that process the data once the data is passed through the network-device hardware and protocol-processing software. The advantage to this software-based protocol processing implementation is that it allows a general-purpose computer to be used in many different types of communications networks and supports any applications that may be needed. The result of this software-based protocol processing implementation, however, is that the overhead of the protocol-processing software, running on the Central Processing Unit (CPU) of the host computer, to process the Network, Transport, Session and Presentation layers is very high. A software-based protocol processing implementation also requires a large amount of memory on the host computer, because data must be copied and moved as the software processes it. The high overhead required by protocol-processing software is demonstrated in U.S. Pat. No. 5,485,460 issued to Schrier et al. on Jan. 16, 1996, which teaches a method of operating multiple software protocol stacks. This type of software-based protocol processing implementation is used, for example, in computers running Microsoft Windows.

During normal operation of a network device, the network-device hardware extracts the data packets that are then sent to the protocol-processing software in the host computer. The protocol-processing software runs on the host computer, and this host computer is not optimized for the tasks to be performed by the protocol-processing software. The combination of protocol-processing software and a general-purpose host computer is not optimized for protocol processing and this leads to performance limitations. Performance limitations in protocol processing, such as the time lag created by the execution of protocol-processing software, is deleterious and may prevent, for example, audio and video transmissions from being processed in real-time or prevent the full speed and capacity of the communications network from being used. It is evident that the amount of host-computer CPU overhead required to process a protocol is very high and extremely cumbersome and requires the use of the CPU and a large amount of memory in the host computer.

New consumer and industrial products that do not fit in the traditional models of a network device are entering the market and, at the same time, network speed continues to increase. Examples of these consumer products include Internet-enabled cell phones, Internet-enabled TVs, and Internet appliances. Examples of industrial products include network interface cards (NICs), Internet routers, Internet switches, and Internet storage servers. Software-based protocol processing implementations are too inefficient to meet the requirements of these new consumer and industrial products. Software-based protocol processing implementations are difficult to incorporate into consumer products in a cost effective way because of their complexity. Software-based protocol processing implementations are difficult to implement in high-speed industrial products because of the processing power required. If protocol processing can be simplified and optimized such that it may be easily manufactured on a low-cost, low-power, high-performance, integrated, and small form-factor device, these consumer and industrial products can read and write data on any communications network, such as the Internet.

A hardware-based, as opposed to software-based, protocol processing implementation, an Internet tuner, is described in J. Minami; R. Koyama; M. Johnson; M. Shinohara; T. Poff; D. Burkes; Multiple network protocol encoder/decoder and data processor, U.S. Pat. No. 6,034,963 (Mar. 7, 2000) (the '963 patent). This Internet tuner provides a core technology for processing protocols.

It would be advantageous to provide a communications processor of a class, such as the Internet tuner discussed above, that provides basic desirable features as LAN support, and additional features, such as compression for audio applications.

SUMMARY OF THE INVENTION

The invention comprises a communications processor of a class, such as the Internet tuner discussed above, which provides such basic desirable features as protocol processing to provide LAN support, and additional protocol processing and data processing features, such as compression for audio applications. The invention provides a low-cost, low-power, high-performance, easily manufactured, integrated, small form-factor communications processor that greatly reduces or eliminates demand on the memory and the CPU of a host computer and provides highly efficient protocol and data processing. The invention comprises a hardware-integrated system that both processes multiple protocols in a streaming manner and processes packet data in one pass. The invention thereby reduces or eliminates the use of host computer memory and CPU overhead.

The '963 patent discloses an Internet tuner for processing (decoding and encoding) protocols and packet data, comprising a network protocol layer module for receiving and transmitting packets and for encoding and decoding network packets which comprise data; a data handler module for exchanging said data with said network protocol layer module; and at least one state machine module that is optimized for a single selected protocol, said state machine module in communication with said data handler module and providing resource control and system and user interfaces; wherein said network protocol layer module, said data handler module, and said state machine module comprise corresponding hardware structures that are implemented in gate-level circuitry and wherein such hardware structures are dedicated solely to performing the respective functions of their corresponding modules.

The preferred embodiment of the invention comprises an auxiliary microprocessor or equivalent that acts as a protocol engine and provides any of LAN support, external interfaces to peripherals and memory, and additional protocol and data processing, such as compression for audio applications, for example, to the Internet tuner of the '963 patent. The presently preferred communications processor incorporates a protocol engine, a set of peripherals for the protocol engine, an Internet tuner core or other network stack, an external controller interface, and a memory interface. The communications processor thus provides network, e.g. Internet, connectivity to a wide range of consumer network devices and industrial network devices.

REFERENCE NUMERALS IN DRAWINGS

Figure 1:
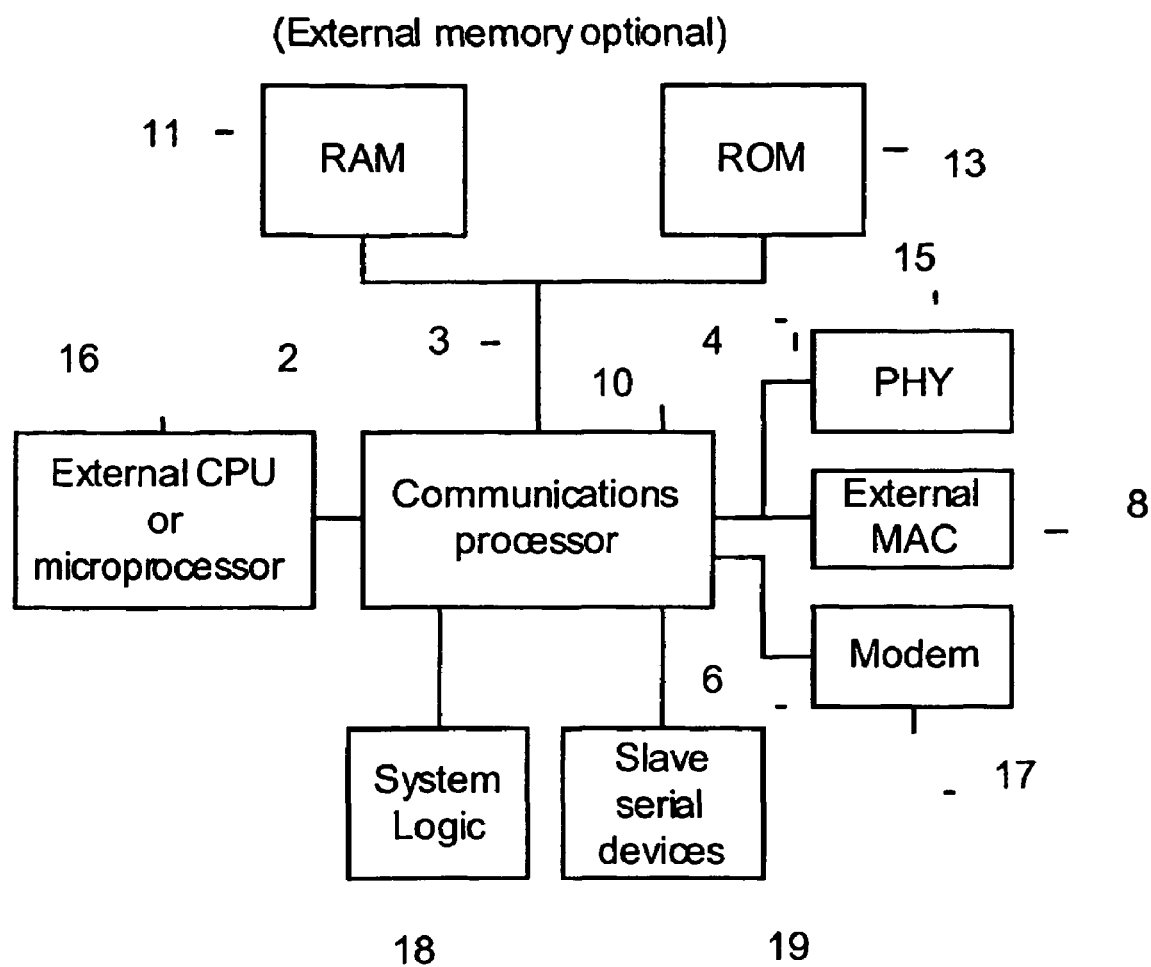
FIG. 1 is a block schematic diagram that depicts a typical network device using a communications processor with external components for LAN and/or dialup communications according to the invention.

The following definitions are used for the following connectors in drawings herein:
2 External CPU, microprocessor, or microcontroller interface
3 External memory interface
4 External data link interface
6 Modem interface
8 Optional external MAC
10 Integrated communications processor
11 External RAM
13 External ROM
15 External PHY
16 Optional external CPU, microprocessor or microcontroller
17 Modem
18 Host system logic
19 Slave serial devices
24 External MAC interface
26 IEEE-standard MII (media-independent interface)
28 Network stack interface
30 Protocol engine memory
32 Protocol engine bus controller
34 Protocol engine
36 System peripherals
38 ADPCM accelerator engine
40 Base64 encoder and decoder
42 G3 encoder engine
44 General-purpose input/output (GPIO) module
46 MAC memory
48 Network stack memory
50 Network stack
52 MAC interface module
54 PPP engine
56 Auxiliary serial-port module
58 Modem interface module
60 iReady-port module
62 MIME-string search engine
64 Text-rasterizer engine
66 Master synchronous serial-interface module
68 External CPU interface module
70 Communications processor bus
72 ARP engine
80 Protocol engine interface module
82 Socket engine (handles management of data received from or to be sent to the TCP/UDP transport engine)
84 TCP/UDP transport engine (handles processing of UDP and TCP packets)
86 IP engine
88 IP router—top engine (handles the router lookups and calculates the next hop)
90 IP filter engine
92 IP router—bottom engine (switches data down to the correct physical layer and arbitrates data coming up from physical layers)

94 Socket RX ram interface.
96 Socket memory arbitrator (allows only one socket to access socket buffers at a time)
98 Socket TX ram interface
100 Network stack internal memory arbitrator (raw IP and IP filter memory accesses)
102 Network stack internal memory interface (see 116)
104 IP raw mux (switches data to ARP module or raw IP interface)
110 MAC buffer RAM interface (see 120)
112 RX socket buffer
114 TX socket buffer
116 Network stack internal memory
118 MAC buffer memory (see 132 and 134)
120 MAC control buffer (arbitrates access to MAC packets in MAC buffer)
122 MAC mux (switch that connects internal MAC core or external MAC core to the MAC buffers)
124 External MAC interface (allows interfacing to external MAC)
126 MAC core (internal Ethernet MAC core)
128 SPI data-link Interface (encodes and decodes MAC data packets to and from the SPI bus interface)
130 Signal mux (switches external data-link interface between MII interface, IP-only mode interface, or external MAC interface)
132 MAC receive buffer
134 MAC transmit buffer
136 Raw IP data bus
170 Memory-management unit (MMU)
172 DMA controller (DMAC)
176 Timer
174 Interrupt controller (INTC)
178 Watchdog timer (WATCH

DETAILED DESCRIPTION OF THE INVENTION

The following sections describe an inventive communications processor. The discussion herein defines the architecture of the presently preferred embodiment of the communications processor, describes the various diagrams that accompany this document, and discusses various features of the invention. When combined with a PHY or modem or both, the herein disclosed communications processor provides industrial and consumer products with the protocol processing needed to connect to the Internet, send and receive, for example data, email, web documents, digital files, audio, video, or other data in digital format.

The presently preferred communications processor is based in part on the Internet tuner described in J. Minami; R. Koyama; M. Johnson; M. Shinohara; T. Poff; D. Burkes; Multiple network protocol encoder/decoder and data processor, U.S. Pat. No. 6,034,963 (Mar. 7, 2000) (the '963 patent). The preferred embodiment of the invention adds any of LAN support, external interfaces to peripherals and memory, and additional protocol and data processing features, such as compression for audio applications.

Examples (but not for purposes of limitation) of applications in which the invention may be used include:
 Industrial and consumer network devices;
 Internet storage and compute servers;
 Internet switches, routers, load balancers, firewalls, gateways, bridges;
 Network interface cards and host-bus adapters;
 Switch fabrics and other high-speed networks and internetworks;
 Cell phones, including Internet-enabled cell phones and packet-based 3G cell phones;
 Internet appliances such as network computers or wireless Internet-enabled TVs;
 Internet fax machines, answering machines and other telephone-line or LAN-based appliances and devices; and
 Consumer appliances with network connections such as digital cameras; and MP3 players.

Definitions

The following definitions are used for the following acronyms and terms herein:

| | |
|---|---|
| ADPCM | Adaptive Differential Pulse Code Modulation |
| ARP | Address Resolution Protocol |
| CPU | Central Processing Unit |
| DHCP | Dynamic Host Configuration Protocol |
| HATR | Hardware Assisted Text Rasterization |
| ICMP | Internet Control Message Protocol |
| IP | Internet Protocol |
| IPV4 | Internet Protocol, Version 4 |
| MAC | Media Access Controller |
| MDIO | Management Data Input/Output |
| MII | Media Independent Interface |
| MIME | Multipurpose Internet Mail Extension |
| PPP | Point-to-Point Protocol |
| RARP | Reverse Address Resolution Protocol |
| SPI | Serial Peripheral Interface |
| TCP | Transport Control Protocol |
| UDP | User Datagram Protocol |
| UI | User Interface |

Overview

The invention provides a low-cost, low-power, easily manufactured, integrated, small form-factor network access module that has a low memory demand and provides a highly efficient protocol decode. The invention comprises a hardware-integrated system that both decodes and encodes multiple network protocols in a streaming manner concurrently and processes packet data in one pass, thereby reducing system memory, power consumption, and form-factor requirements, while also eliminating software CPU overhead.

The '963 patent discloses an Internet tuner for decoding and encoding network protocols and data, comprising a network protocol layer module for receiving and transmitting network packets and for encoding and decoding network packet bytes which comprise packet data; a data handler module for exchanging said packet data with said network protocol layer module; and at least one state machine module that is optimized for a single selected network protocol, said state machine module in communication with said data handler module and providing resource control and system and user interfaces; wherein said network protocol layer module, said data handler module, and said state machine module comprise corresponding hardware structures that are implemented in gate level circuitry and wherein such hardware structures are dedicated solely to performing the respective functions of their corresponding modules. The preferred embodiment of the invention comprises an auxiliary processor or protocol engine that adds any of LAN support, external interfaces to peripherals and memory, and additional protocol and data processing, such as compression for audio applications, for example, to the Internet tuner of the '963 patent. The presently preferred communications processor incorporates a protocol engine, a set of peripherals for the protocol engine, an Internet tuner core, an external controller interface, a memory interface, and two auxiliary serial ports. The communications processor thus provides network, e.g. Internet, connectivity to a wide range of devices.

FIG. 1 is a block schematic diagram that depicts a typical network device using a communications processor 10 with external components for LAN or dialup communications according to the invention. Such system comprises the integrated communications processor 10, network-device hardware such as a PHY 15 (for LAN connection) or a modem 17 (for dialup communication), host system logic 18, one or more slave serial devices 19, an optional external CPU or microprocessor 16, and optional external memory such as RAM 11 or ROM 13. It should be noted that the communications processor 10 is capable of performing all protocol processing. In prior art the protocol processing is performed in the host system logic 18.

Figure 2:
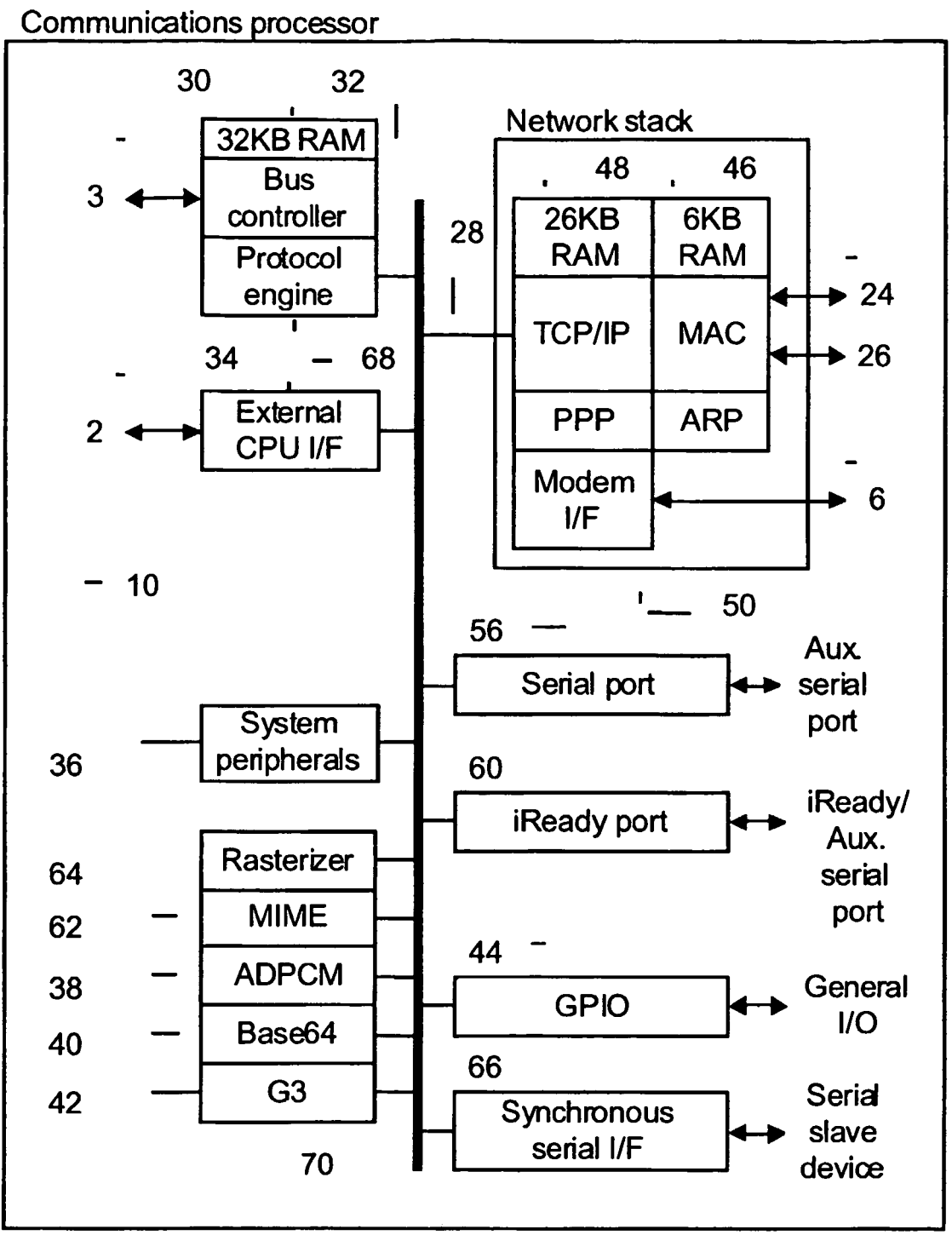
FIG. 2 is a block schematic diagram of a communications processor according to the invention.

FIG. 2 is a block schematic diagram of a communications processor 10 according to the invention. Such communications processor 10 comprises a network stack 50 connected to a protocol engine or auxiliary microprocessor 34. The protocol engine 34 is connected to a bus controller 32. The bus controller 32 allows the protocol engine 34 to use an internal 32 KB memory 30 or the optional external memory. In this description the unit KB when applied to the size of memory refers to kilobytes of memory, where a kilobyte is 1024 bytes. In this description a byte of memory is eight bits of memory. The network stack 50 is connected directly to a 26 KB internal RAM 48, a media access controller (MAC) interface (I/F) 52, and a PPP module 54. The MAC has access to 6 KB of internal RAM 46 and connects the network stack 50 to an external PHY 15 or an external MAC 8. The PPP module 54 connects the network stack 50 via the modem interface (I/F) module 58 to a modem 17. The external controller interface 68 allows the protocol engine 34 to be communicate with an external CPU, microprocessor, or microcontroller 16. The network stack 50, the protocol engine 34, and controller interface 68 communicate via a communications processor bus 70. Also connected to the communications processor bus 70 are system peripherals 36, an auxiliary serial port 56, a dual-function proprietary serial port or second auxiliary serial port 60, a synchronous serial interface 66, general I/O 44, and a series of specialized data and protocol processing modules, or offload engines. All of the modules connected to bus 70 look like peripherals to the protocol engine 34. The specialized data and protocol processing modules or offload engines include a text rasterizer engine 64, a MIME string search engine 62, an ADPCM accelerator engine 38, a base64 encoder and decoder 40, and a G3 encoder engine 42. Such specialized data and protocol processing modules or offload engines may perform a variety of functions. The specialized data and protocol processing modules 38, 40, 42, 62, and 64, allow the implementation of the following features, for example:

40. ITU T.37 compatibility;
41. Base64 accelerator;
42. G3 and text rasterizer accelerators;
43. Support transport of JPEG encoded color images; and
44. MIME string search accelerator.
22. ADPCM compression and decompression.

Figure 3:
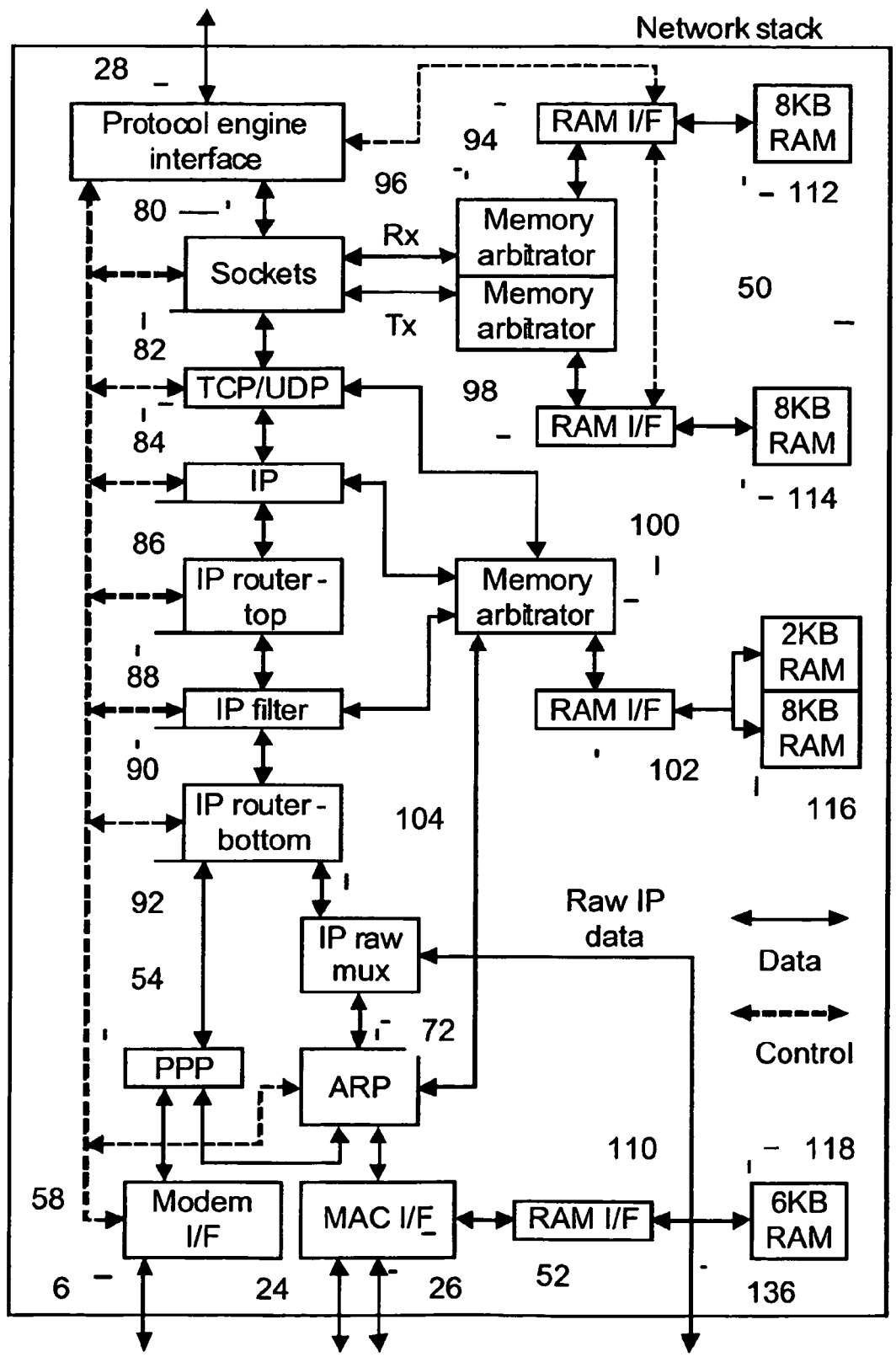
FIG. 3 is a block schematic diagram of a network stack, which is part of the communications processor, according to the invention.

FIG. 3 is a block schematic diagram of a network stack according to the invention. Such network stack 50 comprises a one or more hardware modules that perform protocol processing in an analogous fashion to a protocol stack that is normally implemented in software. This network stack comprises hardware modules that implement the Data Link layer: a PPP module 54 and a MAC interface 52; and the Network, Transport, Session, and Presentation layers for the TCP/IP protocol suite: an ARP module 72, an IP raw multiplexor (mux) module 104, an IP router—bottom module 92, an IP filter module 90, and IP router—top module 88, and IP module 86, a TCP/UDP module 84, and a sockets module 82. The sockets module 82 connects to a protocol engine interface module 80. The protocol engine interface module 80 connects to the protocol engine 34 via the communications processor bus 70.

The present communications processor 10 uses a master clock that may be set in frequency from 8 MHz to 70 MHz. The clock frequency chosen depends upon the application and the protocol engine 34 that is used. The presently preferred communications processor 10 uses a Zilog Z80 core, a popular 8-bit microprocessor, as the protocol engine 34, but any microprocessor, such as ARM, ARC, PowerPC, or MIPS, could be used. A Z80 microprocessor is most suited to low-cost consumer applications that do not require high-speed communications. A more powerful microprocessor or combination of microprocessors could be used as the protocol engine 34 for industrial and high-performance applications.

The following discussion describes the interface between the communications processor 10 and an optional external CPU, microprocessor, or microcontroller 16. The interface pins can be configured as either a parallel or serial (SPI) interface (described in more detail later), or if no external CPU, microprocessor, or microcontroller 16 is attached, these interface pins may be used as general-purpose I/O pins. A register set is provided as a communication channel between the external CPU, microprocessor, or microcontroller 16 and the communications processor 10. The communications processor 10 operates in one of two modes: normal mode, and CPU-bypass mode. Mode selection is performed using configuration pins. When configured for CPU-bypass mode, the protocol engine 34 is disabled, and the external CPU, microprocessor, or microcontroller 16 can communicate directly with the network stack 50 using an application programming interface (API) register set. When configured for normal mode the protocol engine 34 is enabled, and the external CPU, microprocessor, or microcontroller 16 communicates via a set of registers described that are described in the next section.

In normal mode the external CPU, microprocessor, or microcontroller 16 can access the network stack memory 48 using two methods. The first method involves cooperation with the protocol engine 34. In this first method, the protocol engine 34 must set up one of two sets of address registers depending on whether the external CPU, microprocessor, or microcontroller 16 is reading or writing to the network stack memory 48. In the second method the external CPU, microprocessor, or microcontroller 16 sets up the read address or write address to access the network stack memory 48. If the external CPU, microprocessor, or microcontroller 16 wants to write to the network stack memory 48, then it writes the starting memory address to a set of registers. The external CPU, microprocessor, or microcontroller 16 can then start to write data. The address registers increment with each write. If the external CPU, microprocessor, or microcontroller 16 wants to read the network stack memory 48, it initializes a set of registers to the starting address of the network stack memory 48 that is to be read. The address registers increments with each read. There is also a subset of the CPU-bypass mode called the test-index mode used primarily for test and diagnostic purposes. The test-index mode effectively allows the external CPU, microprocessor, or microcontroller 16 to control the network stack 50 while keeping the protocol engine 34 enabled. The protocol engine 34 may also be kept in reset (in an inactive state) so that the protocol engine 34 and the external CPU, microprocessor, or microcontroller 16 do not simultaneously access the network stack 50. If simultaneous access to the network stack 50 from the protocol engine 34 and the external CPU, microprocessor, or microcontroller 16 does occur, the results are unpredictable. However, if the protocol engine 34 is not programmed to access the network stack 50, then the external CPU, microprocessor, or microcontroller 16 need not be kept in reset.

Figure 4:
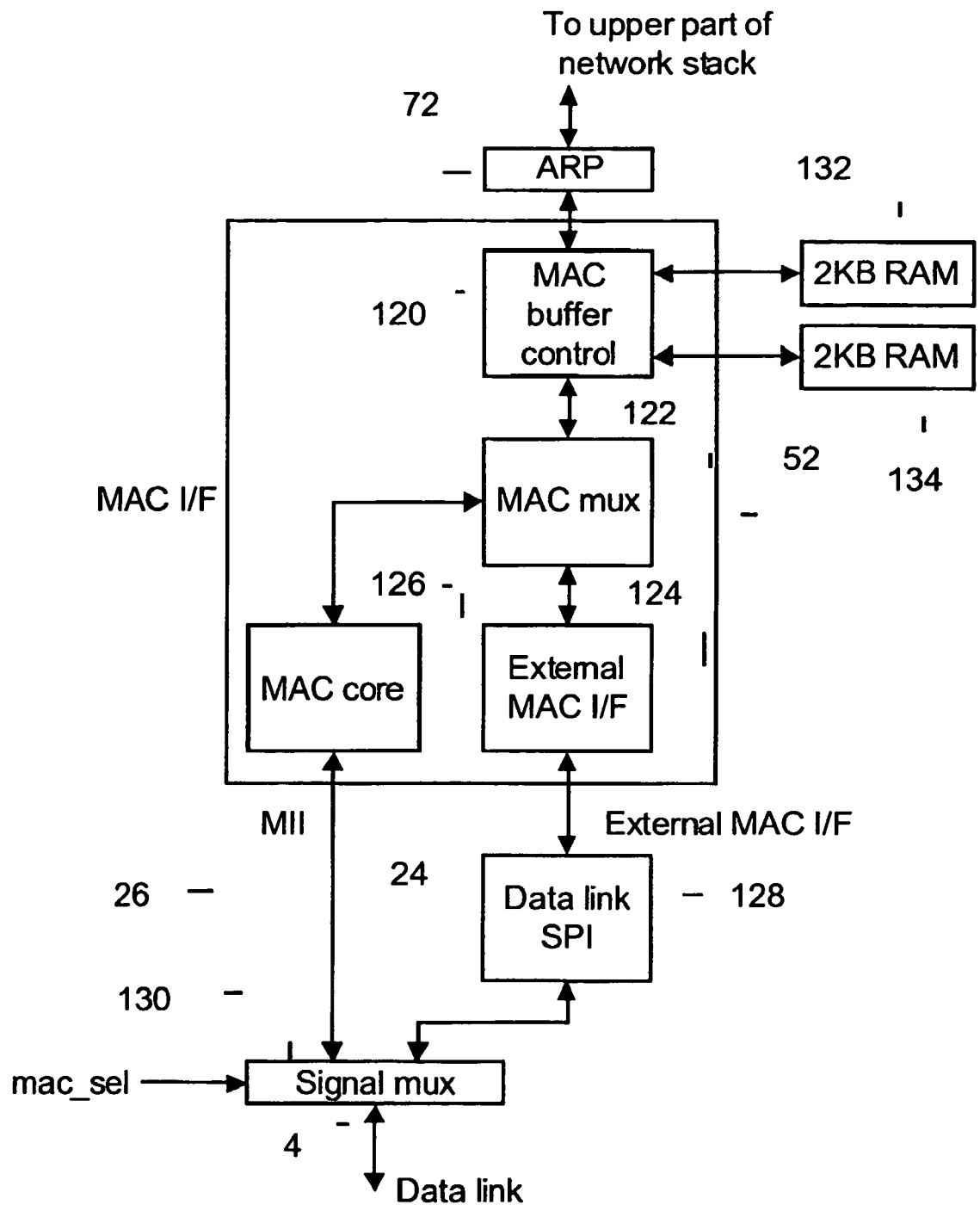
FIG. 4 is a block schematic diagram of a MAC interface, which is part of the network stack, according to the invention.

FIGS. 3 shows a MAC interface 52 and an external MAC interface 24 together with an IEEE standard MII (media-independent interface) 26 that connects to an external PHY 15. The same interface pins can be configured as the MII interface to an external PHY, or as an SPI interface for either an external MAC or raw IP data. Additionally, if modem operations are mutually exclusive with LAN operations, then the same interface pins may also be used to support the external modem interface 6. FIG. 4 shows the MAC interface 52 and the external MAC interface 24 in more detail. The communications processor 10 supports both the internal MAC 126, as well as an external MAC 8. The internal MAC 126 is compliant to the IEEE 802.3 standard and uses the IEEE standard MII (media-independent interface) 26 to communicate with the external PHY 15. The current revision of the communications processor supports both 10 Mbps and 100 Mbps Ethernet speeds, but the architecture may be scaled to operate at both lower and higher speeds. Presently the PHY 15 is external, but the PHY 15 could be integrated into the communications processor 10. When an external MAC 8 is used, the serial peripheral interface (SPI) is active. Since an external MAC 8 and the internal MAC 126 are not used at the same time, the connections from the internal MAC 126 and the connections to the external PHY 15 may share common package pins of the communications processor 10. A signal multiplexor (mux) 130, shown in FIG. 4, controls the function of these package pins under user configuration. Two RAM buffers 132 and 134, and a MAC buffer control 120 are included in the data path when either MAC data path is used because of the different clock domains that are used for transmitting and receiving data. The RAM buffers may be substantially larger without affecting the architecture for higher-performance applications. Data going into and out of the external MAC interface 52 is synchronous to the transmit clock (for transmit) and synchronous to the receive clock (for receive). Outgoing data packets that are being transmitted are buffered in the 2 KB RAM transmit buffer 132 prior to being transmitted, thereby optimizing data flow and avoiding any under-run conditions, for example. Incoming data that is being received is stored in the 4 KB RAM receive buffer 134 until a complete data packet is received and the data packet has been verified as valid. Complete and verified received data packets are made available to the upper part of the network stack 50 through the ARP module 72 (see the details of the network stack shown in FIG. 3). The external MAC interface 24 is selected by setting a register bit.

The protocol engine 34 uses an internal (integrated or on-chip) 32 KB RAM 30 and optional external RAM 11 and external ROM 13. The external RAM 11 and external ROM 13 is not needed when all of the code and data of the protocol engine 34 is less than the size of the internal RAM 30 or when the communications processor 10 is operated in CPU-bypass mode. The internal 32 KB RAM 30 may be made substantially larger for high-performance applications without affecting the architecture. The protocol engine internal RAM 30 is capable of being battery-operated via I/O pins to allow nonvolatile storage of code when no external ROM 13 is used.

This section describes the external memory connections used in normal operation. The present version of the communications processor 10 provides programmable wait states for the optional external ROM 13 so that a variety of ROM speeds may be used. However, slower ROMs may have an impact on overall performance. The optimum ROM speed is application dependent, but in general 70 ns ROMs provide adequate performance for consumer applications and are currently readily available and inexpensive. The present version of the communications processor 10 uses 8-bit ROM for the external ROM 13 and uses 8-bit RAM for the external RAM 11. Programmable wait states are provided for the external RAM 11. The optimum speed of the external RAM 11 is dependent on the application, but 70 ns parts offer adequate performance for most consumer product applications. The present version of the communications processor 10 is designed to use 8-bit SRAM for the external RAM 11, but other RAM sizes, organizations, and types such as SDRAM or DDR SDRAM may also be used that require changes to the bus controller 32, but without significant changes to the rest of the architecture.

Figure 5:
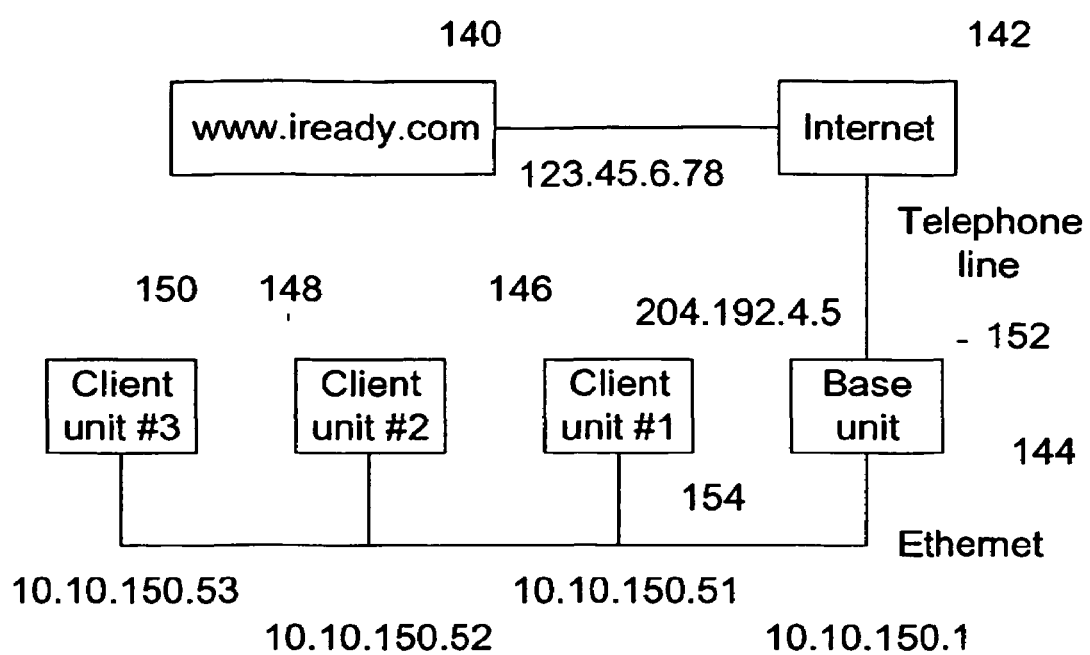
FIG. 5 is a block schematic diagram of an exemplary network according to the invention.

The present version of the communications processor 10 contains a powerful IP filter engine 90 to support such features as, for example, network address translation (NAT) and IP masquerading. The first function of the IP filter 90 is to parse the information in the incoming data packet (for example the type of packet, the source and destination IP addresses, the source and destination port numbers, and so on). The information from the data packet is made available to the protocol engine 34 so that the protocol engine 34 can decide what to do with the data packet. The protocol engine 34 may intercept the data packet, pass the data packet up the network stack 50, discard the data packet, or re-transmit (forward) the data packet. Prior to receiving or forwarding the packet, the protocol engine 34 may modify any packet parameter, including, but not limited to, the source IP address, destination IP address, source port, destination port, and the time-to-live (TTL). The IP filter engine 90 will then recalculate the appropriate checksums and send the packet as directed by the protocol engine 34. The protocol engine 34 controls these and other functions of the network stack 50 via the protocol engine interface 28. The second function of the IP filter 90 is to inject data packets back into the network stack 50. Injected data packets can come from either the IP filter engine 90 or the protocol engine 34. The IP filter engine 90 may be enabled under control of the protocol engine 34 using a range of settings. For example the IP filter 90 may be enabled to filter on the basis of specific ports, IP addresses, or on the basis of specific protocols. These IP filter criteria are set using registers. The following sections describe the theory of the operation of the IP filter 90 for supporting NAT and IP masquerading. FIG. 5 is a block schematic diagram of an exemplary network according to the invention.

In the example network of FIG. 5, the base unit (or base node or base network device) 144 contains a communications processor for both Ethernet LAN and telephone-line links, thus supporting two data links, i.e. Ethernet link 154 and a telephone-line or dialup link 152. The base unit 144 has an IP address associated with each data link. The IP address associated with the Ethernet link, 10.10.150.1, is a local IP address and is not recognized external to the Ethernet LAN. The IP address associated with the telephone-line link, 204.192.4.5, is recognized external to the Ethernet LAN, and may, for example, be a floating IP address that was assigned to the base unit 144 by an Internet service provide (ISP) during PPP negotiations, or it may be a permanent IP address. Although not shown or discussed explicitly in the example network described here, the client units (146, 148, and 150) may also contain a communications processor for both Ethernet link and telephone-line link. As another example, the communications processor may contain multiple Ethernet links or telephone-line links and thus multiple client units (146, 148, and 150) may be part of a single network device. The combination of the IP filter functions and support for multiple data links in a single integrated communications processor 10 enables such sophisticated features as, for example, failover or load-balancing to be performed.

In this section we describe the connections between client units (146, 148, and 150) and the Internet for the example network shown in FIG. 5. Assume client unit #1 146 wants to access www.iready.com 140 on the Internet 142. In this case client unit #1 146 sends a packet with its IP address (10.10.150.51) as the source IP address, and the IP address of www.iready.com (123.45.6.78) as the destination IP address. Client unit #1 146 detects that the destination IP address is not on the local network and sends the packet to the base unit 144, assuming that the base unit is set up as the default gateway. Once the base unit 144 receives the packet, it is passed from the Ethernet MAC interface 52 to the ARP engine 72. The ARP engine 72 examines the packet to see if it is an ARP packet, an IP packet, or an unknown packet. In this case, because the received packet is an IP packet, it is passed to the IP router engine—bottom 92. The IP router engine—bottom 92 arbitrates between incoming packets coming from the Ethernet path and PPP module 54. If no PPP traffic is currently being received, then the received IP packet is sent to the IP filter engine 90. In the IP filter engine 90, the packet is parsed and stored in the IP filter buffer (part of the network stack internal memory 116). The protocol engine 34 is then notified via an interrupt, that a packet has arrived.

When the protocol engine 34 receives the interrupt notification, it uses registers to read the port and IP address information of the received packet to determine what to do with the received IP packet. In this example, the protocol engine 34 operates on the received IP packet and replaces the source IP address (10.10.150.51) of client unit #1 146 with the base unit 144 global IP address (204.192.4.5), and replaces the client unit #1 146 source port number with a port number that the base unit 144 associates with this socket. When these values are written to the appropriate IP filter registers, a SND command is issued. Upon receiving the SND command, the IP filter engine 90 replaces the port and IP address information, recalculates the IP and TCP header checksums, and transmits the packet over the telephone-line link 152 (in this example network). The protocol engine 34 also logs a socket connection between a port on client unit #1 146 and a port on www.iready.com 140.

When the base unit 144 receives the return packet from www.iready.com 140, via the dialup link in the example network shown in FIG. 5, the incoming return packet is handled by the PPP module 54. The PPP module 54 stores the incoming return packet into the PPP memory buffer (part of the network stack internal memory 116). When the entire incoming return packet is received, and the frame checksum (FCS) is validated, the PPP buffer notifies the IP router engine—bottom 92. If no Ethernet packet is currently being received via the Ethernet data link, then the incoming return packet is sent from the PPP module 54 to the IP filter engine 90 via the IP Router Bottom 92. The IP filter engine 90 parses the received packet and stores it in the IP filter buffer (part of the network stack internal memory 116) and notifies the protocol engine 34, via an interrupt, that a packet has arrived. The protocol engine 34 examines the packet's port and IP address information, and recognizes that the destination port number contained in the packet is the port number that is associated with a socket connection for client #1. The protocol engine 34 replaces the destination port with the original source port from client unit #1 146, and replaces the destination IP address with the IP address of client unit #1. When this is complete, the protocol engine 34 issues a SND command. This SND command causes the IP filter engine 90 to replace the port number and IP address, recalculate the checksums, and then send the packet out via the Ethernet link 154. Determination of which physical link the packet should use is handled by the IP router—bottom engine 92.

The sequence of events just described corresponds to the functions required by network address translation (NAT) and IP masquerading. The process of receiving and transmitting packets then continues in this manner until the connection is closed. The protocol engine 34 can determine the closing of a connection by snooping (viewing) the TCP header flags of the transmitted and received packets. When the protocol engine 34 recognizes that a connection has been closed, the protocol engine 34 removes that connection log from its active connection table stored in internal memory 30 or external memory 12. Using this method, the number of simultaneous connections that can be maintained is only limited by the amount of memory available to the protocol engine 34 in the base unit 144. Consumer network devices that only require a few (1-10) connections may use a small memory, such as the internal memory 30, and industrial devices that may require thousands of connections can employ external memory 12.

For UDP connections the communications processor 10 uses a timeout mechanism because, unlike TCP, UDP does not have any notion of opening or closing a connection. A timer resets every time a UDP packet for a connection is received. The timer may be set under external control, with a presently preferred default timeout value of 15 minutes.

In this section we discuss how the connections between the client units (146, 148, and 150) and the base unit 144 are handled for the example network shown in FIG. 5. Assume a data packet is sent from a client unit to the base unit 144. When the received packet reaches the IP filter engine 90 of the base unit 144, it notifies the protocol engine 34 that a packet has arrived. The protocol engine 34 examines the received data packet, and determines if the received data packet is intended for the base unit 144. If the received data packet is intended for the base unit 144, the protocol engine 34 issues a command, the REC command, to the IP filter engine 90. The REC command causes the received data packet to be passed up the network stack via the IP router—top engine 88, the IP engine 86, the TCP/IP engine 84, and the sockets module 82. The data from the received data packet is passed through a network stack socket interface. When the base unit 144 needs to send data back to the client unit it uses the network stack socket interface. The packets are then generated by the TCP/UDP engine 84. The TCP/UDP engine will query the IP router—top engine 88 for the next-hop IP address and the appropriate source IP address. Both of these parameters are determined by the IP router—top engine 88 based on the destination IP address for the packet. The packet is then passed through the IP engine 86. The IP engine prepends the IP header, and sends a transmission request to the IP router—top engine 88. The packet is then sent through the IP filter 90 without modification to the IP router—bottom engine 92. At this point, based on the next-hop IP address, the IP router—bottom engine 92 will route the packet to the appropriate physical data link. In this case, it will send the packet to the ARP engine 72. The ARP engine 72 will then use the next-hop IP address to look up the corresponding MAC address. With this information, the ARP engine 72 generates the Ethernet header and prepends it to the packet. The complete packet is then sent to the MAC interface 52. In the MAC interface 52, the packet is first queued in the MAC transmit buffer 134 by the MAC buffer controller 120. The packet is then copied from the MAC transmit buffer 134 to the internal MAC 126 and finally out via the MII interface 26 to the external PHY 15 and on to the client units 146, 148, and 150.

In this section we describe how the connections between the base unit 144 and the Internet 142 are handled for the example network shown in FIG. 5. When data packets are generated by the TCP/UDP engine 84, the flow follows the same path as described in the previous section up to the point where it reaches the IP router—bottom engine 92. The IP router—bottom engine 92 in this case will pass the packet to the PPP engine 54 which will prepend the PPP header, perform any data escaping necessary, and calculate and append the PPP cyclic redundancy check (CRC). The complete packet is then transmitted via the modem interface module 58 and the modem interface 6 to external modem 17 and the Internet 142 over the telephone-line link 152 (in the case of this example network).

When the PPP engine 54 receives reply data packets, it sends the data packets up through the IP router—bottom engine 92, and then to the IP filter engine 90. The IP filter engine 90 parses and stores the data packet in IP filter memory (part of the network stack internal memory 116) and notifies the application that an IP packet has been received. The application then examines the port and IP address information of the data packet, and determines if the data packet is destined for the base unit 144. The application then issues the REC command to the IP filter engine 90, which causes the IP filter to retrieve the packet from the IP filter memory (part of the network stack internal memory 116) and send it to the IP engine 86. The application then processes the data through the network socket interface.

In this section we discuss how ping requests from a client unit to the Internet are handled for the example network shown in FIG. 5. This situation is a special case of the connection between client units (146, 148, and 150) and the Internet 142. The ping requests are entered into a special ping table in the base unit communication processor (in part of the protocol engine internal memory 30). These ping table entries have a timeout, e.g. approximately 10 seconds. If no ping response is received before a time equal to the timeout, the ping table entry is deleted. If a ping response is received before a time equal to the timeout, the sequence number of the ping reply is checked against entries in the ping table for the ping request. If the reply sequence number is correct, the IP address for the client unit that sent the ping request is copied to the ping reply packet. The ping reply packet is then sent to the client unit on the LAN using the Ethernet link 154. The ping table entry is also deleted when the ping reply is received.

In this section we describe how raw IP packets are sent from the base unit 144 for the example network shown in FIG. 5. A raw IP packet is any arbitrary network packet. When the network stack sends raw IP packets, the raw IP packet is copied to the raw IP buffer (part of the network stack internal memory 116) by using commands and special-purpose registers. Based upon the destination IP address for the raw IP packet, the IP router—bottom engine 92 routes the raw IP packet to the proper data link. A register is then cleared to indicate that the raw IP packet has been completely transmitted.

In this section we describe how the base unit 144 receives IP multicast and broadcast IP packets from the Internet 142 for the example network shown in FIG. 5. When the base unit 144 receives a broadcast or multicast IP packet from the Internet, the packet is stored in the IP filter buffer (part of the network stack internal memory 116), and the protocol engine 34 is notified that a packet has arrived. The protocol engine 34 examines the packet, and should it decide to forward the packet, it may modify any appropriate packet parameter, and then issue a SND command. This SND command causes the IP filter engine 90 to recalculate the packet checksums, and send the packet out via the Ethernet link 154.

In this section we describe how the base unit 144 transmits IP multicast and broadcast IP packets for the example network shown in FIG. 5. The base unit 144 can use the network stack socket interface when it sends multicast or broadcast packets. The destination IP address is set appropriately, and the network stack 50 handles the multicast or broadcast packet as a normal IP packet. Alternatively, the protocol engine 34 can send a multicast or broadcast packet out as a raw IP packet.

In this section we describe how the client units handle incoming packets from the Internet for the example network shown in FIG. 5. The base unit 144 uses a port network address translation (NAT) table. This table matches port numbers with the client units on the LAN. For example, if client unit #1 146 with IP address 10.10.150.151 is designated as an HTTP server (using port 80), and client unit #2 148 with IP address 10.10.150.152 is designated as a POP server (using port 110), a port NAT table would appear as shown in Table 1.

TABLE 1

Sample Port NAT Table

| Port Number | IP Address |
|---|---|
| 80 | 10.10.150.51 |
| 110 | 10.10.150.52 |

As packets arrive at the IP filter engine 90, they are parsed and stored in the IP filter buffer (part of the network stack internal memory 116) and the protocol engine 34 is notified via an interrupt using the protocol engine interface 28. The protocol engine 34 examines the header parameter registers, via the protocol engine interface 28, to determine if the destination port in the incoming data packet matches any ports in the port NAT table. If the destination port does match a port NAT table entry, then the destination IP address in the incoming data packet is changed to the IP address specified in the table corresponding to that port, and a SND command is issued. The IP filter engine 90 then changes the header parameter registers, recalculates the checksums, and transmits the modified data packet via the Ethernet link. When client unit #1 sends a response data packet back to the base unit 144, the protocol engine 34 again attempts to match the port specified in the response data packet with the port NAT table. If there is a match between ports, the protocol engine 34, via the protocol engine interface 28, changes the source IP address in the packet from the IP address of client unit #1 146 to the IP address of the base unit 144 prior to transmitting the packet to the Internet 142 on the telephone-line link 152 (in this example network).

This section describes the IP filter engine 90 direct memory access (DMA) transfer. The IP filter engine 90 uses 6 KB of the network stack internal memory 116. The 6 KB is split between the IP filter receive buffer, the IP filter send buffer, and the raw IP buffer. The partitioning and size of the buffers may be adjusted in different embodiments. For example both the IP filter receive/send buffer and the raw IP buffer may be 3 KB in length, or one may be 2 KB and the other 4 KB, or each may be considerably larger for long latency or high bandwidth networks. Incoming IP packets are first stored in the IP filter receive/send memory buffer (part of the network stack internal memory 116). The application is notified when the packet is received. If the application wishes to move the packet to the raw IP buffer (part of the network stack internal memory 116), it writes the target memory location in the raw IP memory buffer (part of the network stack internal memory 116) to the DMA address registers. When the write to the DMA address registers is complete, a DMA command is issued to start the DMA transfer. When the DMA transfer is complete, a bit in a status register is set. If interrupts are enabled this status register bit condition triggers an interrupt to the application.

The following sections describe how the network stack 50 handles ICMP echo request packets (or ping packets). The network stack 50 includes specialized and optimized hardware support for ICMP echo reply packet generation. That is, if the IP engine 86 receives an ICMP echo request packet, the IP engine 86 can automatically generate the appropriate ICMP echo reply packet. The IP engine 86 uses part of the network stack internal memory 116 as a temporary store for the data section of the echo request and echo reply packets.

There are two cases to consider for ICMP echo request and reply packet support in the network stack 50. The two cases correspond to the IP filter engine 90 being enabled or disabled.

If the IP filter engine 90 is disabled, ICMP echo request packets pass directly through the IP filter engine 90 and are processed by the IP engine 86. In this first case ICMP echo reply packets are automatically generated by the IP engine 86 using network stack internal memory 116 as a temporary store. The echo reply packet is then transmitted.

When the IP filter engine 90 is enabled it uses the network stack internal memory 116. This prevents the IP engine 86 from using network stack internal memory 116 as a temporary store to generate the ICMP echo reply packets. In this second case the ICMP echo reply is generated under control of the protocol engine 34 via the protocol engine interface 28. The protocol engine 34, via the protocol engine interface 28, changes the ICMP type in the ICMP echo request packet from 0x08 (hex 08) to 0x00, and then swaps the source and destination addresses in the original echo request packet in order to form the echo reply packet. The protocol engine 34 then issues a SEND command to the IP filter 90 via the protocol engine interface 28 in order to transmit the echo reply packet.

The following sections provide an overview of the IP router functions in the network stack 50 including the IP router—top engine 88 and IP router—bottom engine 92. These two IP router engines serve as an extension to the IP engine 86.

The IP router—bottom engine 92 serves as a switch between the Ethernet and PPP transmit and receive data link paths. In the receive direction the IP router—bottom engine 92 checks that two packets are not being received at the same time from the PPP engine 54 (the PPP data link receive path) and the IP raw mux 104 (on the Ethernet data link receive path). All PPP packets are first buffered in part of the network stack memory 116. This is done because the PPP link is often much slower then the Ethernet LAN link. By first buffering the packet, the network stack is able to process PPP packets at the same rate as packets from the Ethernet LAN link. Without packet buffering, packets from the Ethernet LAN link may be held up for long periods while the network stack 50 is processing a slowly arriving PPP packet. In the transmit direction the IP router—bottom engine 92 routes the transmitted packets between the PPP engine 54 (on the PPP data link transmit path) and the IP raw mux 104 (on the Ethernet data link transmit path) based upon the next hop IP address.

When a TCP packet or an IP raw packet is sent, the IP router—top engine 88 checks the destination IP address. If the destination IP address corresponds to the local network, the IP router—top engine 88 transmits the packet directly to network device at the specified IP address using either the Ethernet data link or the PPP data link. However, if the destination IP address does not belong to any directly connected networks, the IP router—top engine 88 searches to find the best gateway (and the appropriate data link) to which to send the packet. The mechanism for this search is described next.

The IP router—top engine 88 uses an n-entry table for routing information, which is described more completely in the following sections. All entries are programmable from the protocol engine 34. Of the n entries, most of the entries are general-purpose routing entries and one of them is a default routing entry. The IP router—top engine 88 is designed to support one or more of both PPP data links and Ethernet data links.

The IP router—top engine 88 sits below the TCP/UDP engine 84 and IP engine 86 and above the PPP engine 54 (on the PPP data link path) and IP raw mux 104 and ARP engine 72 (on the Ethernet data link path) in the network stack 50 (See FIG. 3). The IP router—top engine 88 interfaces directly to the IP engine 86 and the protocol engine 34 via the protocol engine interface 28. The IP router—top engine 88 monitors all outgoing packets and provides the next-hop IP addresses as well as the appropriate source IP address for the packets.

The following sections describe the operation of the IP router—top engine 88. When a data packet is sent from the application layer, the IP router—top engine 88 and IP router—bottom engine 90 cooperate to direct the data packet to the appropriate data link. The IP route table is essential for maintaining IP routing information. The table is implemented in the IP router—top engine 88 and contains n entries: there are several general-purpose routing entries and one default routing entry. The general-purpose entries may be programmed to be either static entries or dynamic entries and the default entry is always a static entry (see Table 2).

TABLE 2

IP Route Table Entries

| Entry Description | Index |
| --- | --- |
| General Purpose Entries (static or dynamic) | 0 through n |
| Default Entry | N/A |

The routing decision, made by the IP router—top engine 88, is based on the information contained in the routing table. The IP router—top engine 88 searches the route table by performing three steps:

Search for a matching host address;
If not found, search for a matching network address; and
If not found, search for a default entry.

After the search is complete, the IP router—top engine 88 determines which data link should be used to transmit a data packet. It passes the next-hop IP address as well as the appropriate source IP address to use for the packet back to the calling engine. The routing is now complete.

The IP route table must be configured before any IP packets are sent. To configure the IP route table, the protocol engine 34, or external CPU, microprocessor or microcontroller 16 writes to a set of application programming interface registers. The following sequence of steps is required to configure the route table before any packets may be sent:

Set up the local IP address registers and PPP registers;
Set up a default route in the route table;
Set up any other general-purpose routes in the route table as needed (this step is optional).

After the registers and the route table are configured, the protocol engine 34 maintains the route table by programming the appropriate routes using the protocol engine interface 80. Typically, routes in the route table can change for any of the following reasons:

A user or system administrator decides to add or edit or delete a route table entry;
DHCP provides updated information about a default gateway;
An ICMP redirect arrives with new route;
Higher level routing algorithms indicate new routes.

After the route table entries are set up the route table permits the data packets to be routed without the further intervention of the protocol engine 34. The IP router—top engine 88 monitors whether data links are up (working or active) or down (broken or inactive) and chooses the data links appropriately. The route table includes the following information: destination IP address and gateway IP address. The route table information may be retrieved from the route table by the protocol engine 34 by executing a read command.

The following sections describe the operation of ARP and the ARP engine 72. The ARP engine 72 resolves an Ethernet hardware address from any given IP address. When IP packets are sent, the destination IP address is not sufficient in an Ethernet network. In order to send a packet, the 48-bit hardware address must also be found. In an Ethernet network, a 48-bit hardware address is used to uniquely identify network devices. In order to map or resolve an IP address to the 48-bit hardware address the following sequence of steps occurs. The ARP engine 72 sends a broadcast ARP request containing the IP address to be resolved to the network. The destination network device, having recognized its IP address in the ARP request, then sends back an ARP reply packet, which includes the 48-bit hardware address of the destination network device, to the ARP engine 72. The ARP engine 72 saves the resolved 48-bit hardware address together with the original destination IP address as an associated pair in the ARP cache. Now, when the application sends another packet to the same destination IP address, the ARP engine 72 knows, by using the ARP cache, where it may find the correct 48-bit hardware address, and where to send the packet without performing another ARP request.

The preferred ARP cache contains four entries. A "Least Recently Used" scheme is applied to update and retire the cache entries. The ARP engine 72 listens to any ARP request that it receives and generates all ARP replies that match its IP address. The ARP cache may contain substantially more entries for higher performance applications without affecting the architecture.

The ARP engine 72 sits below the IP raw mux 104 and IP router—bottom engine 92 in the network stack 50 and interfaces directly to the Ethernet MAC interface 52. The ARP engine 72 has access to the internal network stack memory 116 through the memory arbitrator 100. The ARP engine 72 operates very closely with the IP router—bottom engine 92. In most applications the ARP engine 72 and the IP router—bottom engine 92 are configured together, especially when there are multiple data links that need to be supported, e.g. PPP and Ethernet.

The following sections provide a more detailed description, with an example, of the ARP support features in the network stack 50. ARP provides a dynamic mapping from a 32-bit IP address to the corresponding 48-bit hardware or Ethernet address, e.g. the Ethernet address 11:12:13:AA:B0:C1 (which corresponds to 48 bits). For example, if an email application sends a message, the TCP engine 84 forms an IP packet with a specified destination IP address destined for the IP engine 86 and the IP router—top engine 88. The ARP engine 72 provides a mapping between the IP address and the 48-bit hardware address so that the IP packet can be correctly sent to its destination.

The reverse of ARP, known as the reverse address resolution protocol (RARP), is not supported by the present version of the ARP engine 72, but RARP could be implemented using the same structures and design as the ARP engine 72 with minor modifications.

The ARP cache is essential to maintain the ARP operation. The present cache table implemented in the ARP engine 72 consists of four entries, but the number of table entries may be increased in alternative embodiments. Each cache entry consists of the destination IP address, destination hardware address, and the ARP down counter (the down counter serves as an expiration timeout counter).

The ARP engine 72 is configured by writing to the corresponding application programming interface (API) registers. Configuration is achieved by completing the following two steps:

Set up the ARP cache time expiration register;
Set up the ARP cache retry interval for every ARP request retry After the ARP engine 72 is set up and an application is running, an ARP cache entry is read by writing the ARP cache entry index to the ARP cache select register. The following ARP cache entry information may then be read from registers: the resolved destination IP address, the resolved 48-bit hardware address, and the ARP cache down counter.

This section describes the handling of unsupported packet types. An unsupported packet is any frame that is received from the MAC interface 52 that has an Ethernet frame type other than x0806 (corresponding to an ARP packet) or x0800 (corresponding to an IP packet). The unsupported packet is stored and retrieved by the protocol engine 34 (if this store and retrieval feature is enabled), by setting a bit in the ARP configuration register. The maximum size of an unsupported packet that may be stored by the ARP engine 72 is 2 KB in the dedicated ARP buffer memory (which is attached to the ARP engine 72, but not shown explicitly in FIG. 3). Any unsupported packet that is longer than 2 KB triggers an overflow condition and the excess bytes are dropped. If the protocol engine 34 intends to read any unsupported packet received, it must read the packet from the ARP buffer memory as soon as the unsupported packet interrupt is detected to avoid any overflow condition. The number of bytes that are available in the ARP buffer memory can be read from a register. The protocol engine 34 should only read those bytes that have been stored in the buffer memory to avoid any under-run conditions.

The following sections describe the internal media access controller (MAC) interface 52. The MAC implementation integrated into the network stack 50 enables Ethernet access for network devices that use the communications processor 10. The MAC interface 52 may be configured to operate in two modes: normal and test. During normal mode, the MAC interface 52 transmits data packets created by the network stack 50. The MAC interface 52 also receives data packets, filters the appropriate addresses, and passes the data packets to the network stack 50 for further processing. The MAC interface 52 may also be configured in a test mode where the protocol engine 34 has direct control over the MAC interface 52, bypassing the network stack 50. In this test mode, the protocol engine 34 may send and receive Ethernet frames directly through the MAC send and receive buffers 118. In test mode, the protocol engine 34 is responsible for generating packets including the destination address, source address, Ethernet frame type and length fields, and the packet data payload. When a valid Ethernet data packet is received, the MAC interface 52 passes the entire packet to the protocol engine 34.

The preferred MAC interface 52 currently supports 10/100 Mbps Ethernet and requires a system clock running at a minimum frequency of 8 MHz for 10 Mbps operation. Using the minimum system clock frequency allows the network stack 50 to sustain a throughput equal to the full 10 Mbps Ethernet bandwidth. When the PPP data link path is present, a higher minimum system clock frequency may be required. The minimum system clock frequency is then dependent upon the speed of the PPP data link. Alternative embodiments may include higher speed Ethernet and PPP data links.

The MAC interface 52 supports both full-duplex and half-duplex modes of operation. The default mode is full-duplex and the MAC interface 52 can process and generate pause frames to perform flow control with its data-link partner. The flow-control mechanism is designed to avoid a receive FIFO over-run condition. When the MAC buffer management receives Ethernet packets from the internal MAC 126 or the external MAC 8, it monitors the memory usage in the second-level memory receive FIFO. When there are 64 or less bytes left in the FIFO, the buffer management logic asserts the start_pause signal to the pause-frame generator module. The pause-frame generator module begins to send a pause frame with a maximum pause size to either the internal MAC 126 or the external MAC 8. The buffer management continues to keep track of the memory usage until there are 128 or more bytes available in the FIFO. It then sends an end_pause signal to the pause-frame generator module. The pause-frame generator logic sends a pause frame of zero pause size to end the flow control mechanism. Upon receiving pause frames, the transmit engine in the internal MAC 126 halts any further transmission (if there is one) after the completion of the current frame. In half-duplex mode, the internal MAC 126 issues jam sequences if the first-level receive FIFO has one byte open (indicating a close-to-full condition) during receive.

The internal MAC 126 provides an AutoPHY feature to start auto-negotiation with the data-link partner. The protocol engine 34 first programs the desired link capabilities to registers before enabling the AutoPHY feature. The internal MAC 126 attempts to negotiate capabilities with the PHY chip connected to the other end of the data link through the management data input/output (MDIO) registers on the PHY chip connected to the internal MAC 126. (MDIO is an IEEE standard two-wire bus that allows for communications with physical layer (PHY) devices.) The negotiation involves reading and writing to MDIO registers and is implemented in hardware. When auto-negotiation is completed and the data-link status signal is asserted, the internal MAC 126 interrupts the protocol engine 34. The data link capabilities that were negotiated are reported in registers. If the protocol engine 34 does not use the AutoPHY feature, it first examines the PHY connected to the internal MAC 126 by accessing the MDIO registers in the PHY. The protocol engine 34 then programs the capabilities accepted by the PHY to the MAC configuration registers.

The protocol engine 34 sets up desired capabilities through the AutoPHY feature or by manually examining the PHY chip before the internal MAC 126 can be enabled. The other required setup is to program the local Ethernet 48-bit hardware address. If multicast packets are supported, the multicast mask and address should also be programmed into the appropriate registers. If all other default configuration parameters in the registers are acceptable, the protocol engine 34 can enable the MAC interface 52 by setting the MAC configuration registers.

This section describes how the MAC interface 52 may be reset. To minimize any packet loss due to reset (during both hard and soft resets), the MAC interface 52 is first disabled by clearing bits in the MAC configuration register. A soft reset available for the MAC interface 52 resets all state machines and buffer memory pointers maintained by the MAC buffer management block. However, almost all configurations are preserved by the internal MAC 126 upon soft reset. The protocol engine 34 preferably waits until the soft-reset-done interrupt status sets before re-enabling either transmit or receive. Once the soft-reset-done interrupt is generated, the protocol engine 34 programs any unicast and multicast addresses through registers. Transmit and receive are now ready to be enabled by setting the MAC configuration register. Both hard resets and global soft resets perform a reset for the whole of the MAC interface 52, including all the configuration bits.

Figure 6:
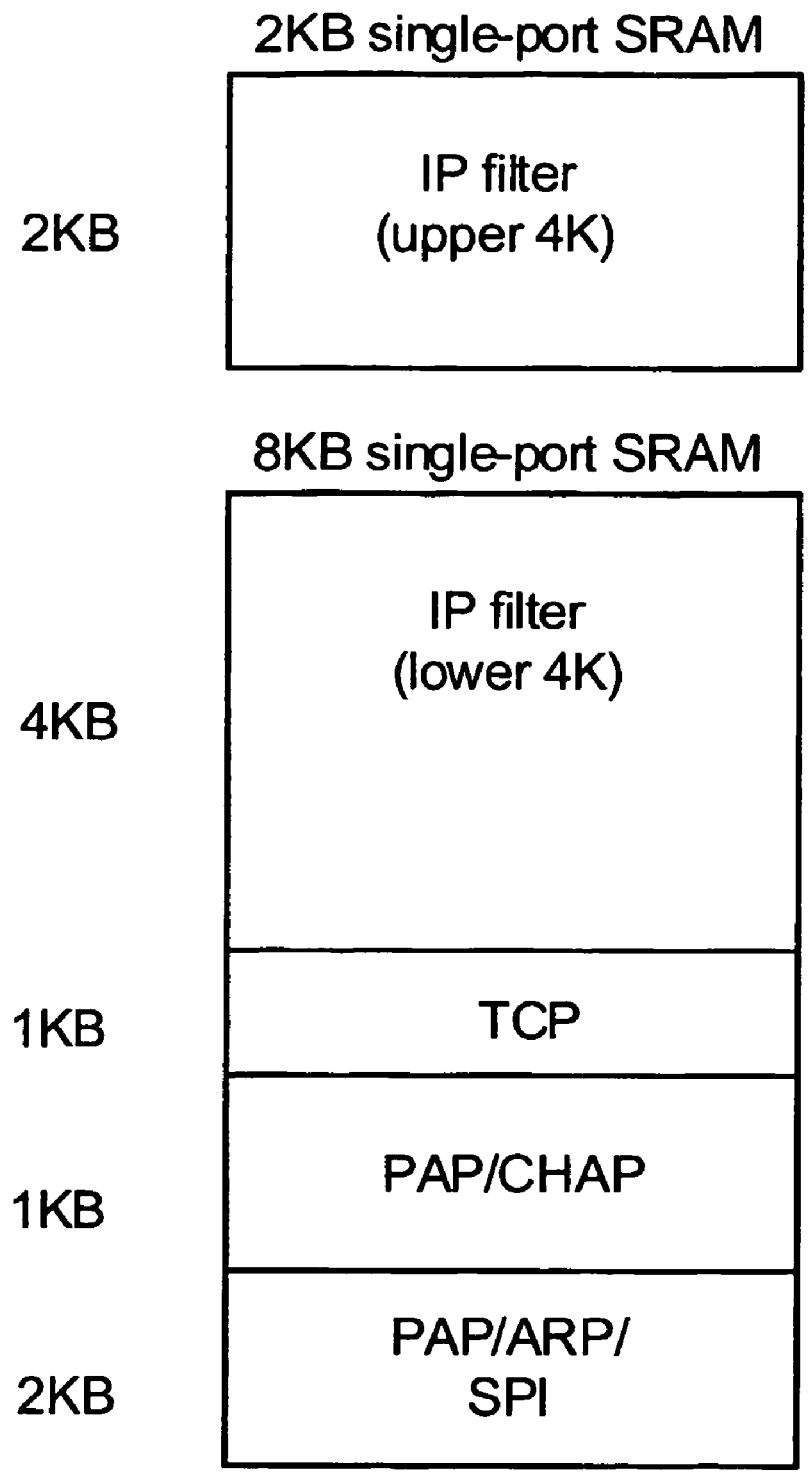
FIG. 6 is a diagram that shows a network stack internal memory map according to the invention.

This section describes the network stack memory architecture. The network stack 50 uses a network stack internal memory 116 for its buffers and work area. FIG. 6 is a diagram that shows a network stack internal memory map according to the invention. In the present implementation the network stack internal memory 116 is divided into two main sections of 2 KB and 8 KB. Both sections of the network stack internal memory 116 use single-port SRAM, although the sizes of the memory and the sections and their uses may be varied greatly and the network stack internal memory 116 may use different types of memory in different embodiments for different applications. In the present implementation the IP filter engine 90 uses two different areas of the network stack internal memory 116. These two different areas are kept in different sections. The lower 4 KB of the IP filter memory is the area into which packet data is streamed (for both transmit and receive). From this lower 4 KB IP filter memory data packets may be copied to or from internal memory 30 or to or from external memory 12. Alternatively data packets may be copied to and from the lower 4 KB IP filter memory to the upper 2 KB IP filter memory under control of the IP filter. This feature is useful for unsupported packet types, for example, which are put aside in the upper 2 KB memory for the protocol engine 34 to handle. The upper 2 KB IP filter memory buffer is also used as a raw IP buffer. The rest of the network stack internal memory 116 is used for TCP header assembly, PAP and CHAP authentication, and a shared buffer for PPP or ARP.

The following sections provide an overview of the protocol engine 34. The communications processor 10 uses a protocol engine 34 for programmability. This protocol engine 34 is also attached to a variety of peripherals, including a standard memory-management unit (MMU), which expands the addressable memory space of the protocol engine 34 to 1 MB. In addition, the protocol engine 34 has access to all of the registers of the communication processor 10.

With the addition of the MMU, the protocol engine 34 has access to 1 MB of memory space. This memory space is divided into RAM and ROM memory types. A register within the MMU specifies the boundary between RAM and ROM memory types. Providing there is no other memory activity and the attached memory is fast enough, the protocol engine 34 can completes a memory accesses without added wait states.

The protocol engine 34 uses a set of registers and interrupts to interface to an optional external CPU, microprocessor or microcontroller 16. Eight interface registers are provided for any mutually agreed upon use by the protocol engine 34 and external CPU, microprocessor or microcontroller 16. When the external CPU, microprocessor or microcontroller 16 reads or writes data to any of the registers, an access interrupt may be made to trigger indicating to the protocol engine 34 that an interface register has been accessed by the external CPU, microprocessor, or microcontroller 16.

In addition to this access interrupt, the external CPU, microprocessor or microcontroller 16 may also interrupt the protocol engine 34 by asserting a bit in a control register. This action causes an interrupt back to the protocol engine 34, assuming the protocol engine 34 has enabled the external interrupt. The protocol engine 34 can then clear this interrupt by writing to the control register.

In a similar fashion, the protocol engine 34 can send an interrupt back to the external CPU, microprocessor or microcontroller 16 by asserting an interrupt bit in the control register. This action causes the external controller interrupt to trigger, assuming that the external CPU, microprocessor or microcontroller 16 has enabled the interrupt. The external CPU, microprocessor or microcontroller 16 can clear the interrupt by writing to the control register.

This section describes a direct data access mode that optimizes data transfers between the network stack 50 and an external CPU, microprocessor or microcontroller 16. When receiving data without the direct data access mode enabled, the protocol engine 34 must read data from the socket receive buffer 112, manage a temporary buffer in its memory space, and have the external CPU, microprocessor or microcontroller 16 read the data from the memory space of the protocol engine 34. Using the direct data access mode, the external CPU, microprocessor or microcontroller 16 can read data directly from the socket receive buffer 112, avoiding a data copy. The direct data access mode also applies for data writes. In the case of writes the external CPU, microprocessor or microcontroller 16 can write data directly to the socket transmit buffer 114.

To enable the direct data access mode, the protocol engine 34 asserts the direct data mode bit in the miscellaneous control register. The protocol engine 34 then writes the appropriate memory address to a register. This is the address of the register that the external CPU, microprocessor or microcontroller 16 is attempting to access. The protocol engine 34 then informs the external CPU, microprocessor or microcontroller 16 how much data there is to be read, or how much room there is to write. Once the external CPU, microprocessor or microcontroller 16 has this information and is granted permission to use the direct data access mode, the external CPU, microprocessor or microcontroller 16 begins reading data or writing data.

When using an external CPU, microprocessor or microcontroller 16 the protocol engine 34 has a mechanism via the direct data access mode to temporarily block the external CPU, microprocessor or microcontroller 16 from accessing the network stack 50. To block access, the protocol engine 34 first sets a bit in the miscellaneous control register. The protocol engine 34 then polls the idle bit in the same register and waits until that bit is asserted. The protocol engine 34 then de-asserts the direct data access mode bit in the miscellaneous control register. At this point, the protocol engine 34 may again access the network stack 50. When protocol engine 34 is finished with an access to the network stack 50, the protocol engine 34 de-asserts the block external CPU bit and re-asserts the direct data access mode bit. This is done in one write cycle to the miscellaneous control register. While the block external CPU bit is asserted, the external CPU, microprocessor or microcontroller 16 is waited when it tries to access the network stack 50. Therefore it is critical that the protocol engine 34 remember to de-assert the block external CPU bit when it is done accessing the network stack 50.

This section describes the peripheral support for the protocol engine 34. The following peripherals are included in the preferred embodiment:

Memory-management unit (MMU) 170
DMA controller (DMAC) 172
Timer 176
Interrupt controller (INTC) 174
Bus controller (BUSC) 32
Watchdog timer (WATCH) 178

Figure 7:
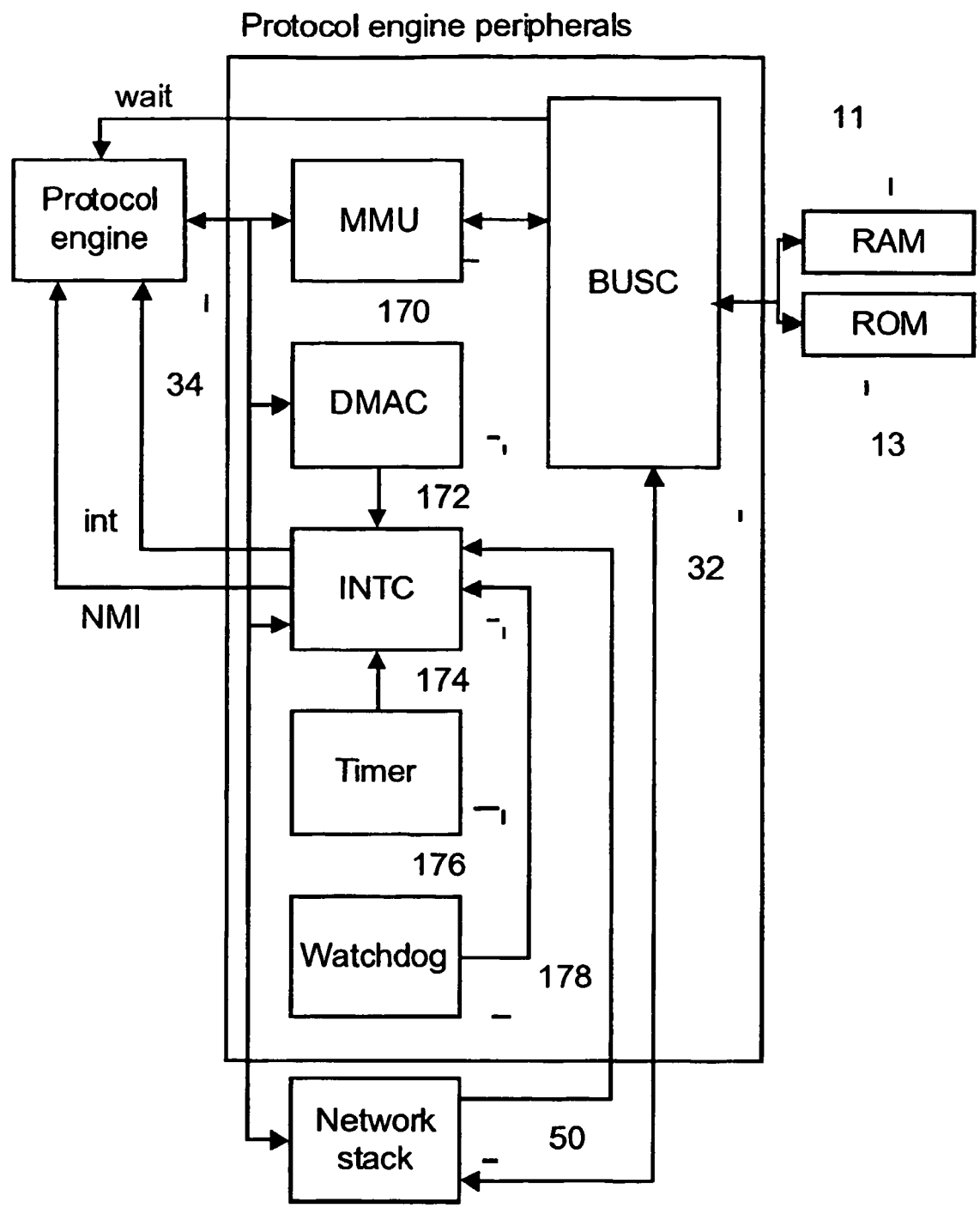
FIG. 7 is a block schematic diagram of the peripherals attached to a protocol engine according to the invention.

FIG. 7 is a block schematic diagram of the peripherals attached to a protocol engine 34 according to the invention. In addition to the peripherals associated with the protocol engine 34, a master SPI port is provided so that the protocol engine 34 can control slave SPI devices. The SPI (Serial Peripheral Interface) is a medium-speed (up to 10 MHz) 3-wire serial bus common in many 8-bit CPUs and peripherals targeted at the 8-bit market. The SPI bus has 3 signals, SCK, MOSI, and MISO. SPI devices are either masters or slaves. Master devices always provide the clock. The clock can be anywhere from near DC to 10 MHz. Most slave devices also use a slave select (or chip select) to select the device on the bus and some slave devices provide feedback with a busy signal. The communications processor 10 may also appear as an SPI slave device when the external CPU, microprocessor, or microcontroller interface 2 is configured as a serial interface (see FIG. 1). Higher-speed serial and parallel buses may be used with the communications processor 10 described here without significant changes to the architecture.

This section describes the memory management unit (MMU). The protocol engine 34 in the present version can only access 64 KB of memory by itself. With the addition of the MMU, the protocol engine 34 memory is extended to 1 MB of physical memory. The protocol engine 34 memory is banked in such a way that at any given time, the protocol engine 34 is still only accessing 64 KB of logical memory.

This section describes the direct memory access (DMA) engine and DMA controller (DMAC) 172. The DMAC 172 moves data from one memory or I/O location to another in an automatic fashion, thus allowing the protocol engine 34 to continue to perform other functions. All DMA transfers are performed in bytes.

The following is an overview of the programming steps required to perform DMA operations:

52. The protocol engine 34 programs the starting source address for the DMA transfers in a first set of registers.
53. The protocol engine 34 programs the starting destination address for the DMA transfers in a second set of registers.
54. The protocol engine 34 programs the DMA transfer type and the addressing modes (incrementing, decrementing, or stationary) into a DMA register. All addressing modes may be applied to both the source and destination addresses.
55. If I/O registers are involved in the DMA transfers, then the appropriate flag bits are set up in the DMA register.
56. After the DMA enable bit is asserted, the DMA engine reads the first byte of data from the source at the given starting source address and temporarily holds the data in a register within the DMAC 172 until it can be written to the destination address. The source address is updated after the source read, and the destination address is updated after the destination write. The byte count decrements after the destination write as well.
57. When the byte count reaches zero, the DMA enable bit is cleared. If the DMA interrupt enable bit is set then an interrupt for the protocol engine 34 is also generated.

This section describes the general-purpose timers and watchdog timer 178 used by the protocol engine 34 and communications processor 10. The present version of the communications processor 10 supports four general-purpose 32-bit timers that may either be used independently or joined together in a cascaded fashion. All timers provide a single programmable counter that triggers either a one-time interrupt or continuously triggers a repeating-loop interrupt that repeats at a programmed periodic rate.

The following sections describe the specialized data processing engines and specialized protocol processing engines that may be added to the communications processor 10. Although particular examples of engines that perform specific operations on data or perform specific assist functions or offload specific protocols are described here, it is to be understood that the approach is a general one, and that other data processing engines or other protocol processing engines may easily be added using the same basic architecture. In general, the specialized data processing engines operate at or near the Presentation or Application layer. In general, the specialized protocol processing engines operate at the Network, Transport, or Presentation layers (often called upper-level protocols, those that are layered above TCP or IP, for example).

This section describes a Base64 encoder and decoder 40. Base64 is used as an encoding scheme for transmitting binary data over Internet connections. It takes three characters in, and transforms them into four characters within a 64-character mapping. The preferred Base64 encoder and decoder, implements the Base64 algorithm as specified and described in the Internet Engineering Task Force (IETF) RFC1341,. Base64 is an encoding scheme and not a compression scheme, in that Base64 takes three bytes of data and transforms the three bytes of data into four bytes of data. Therefore, the transformed data takes up ⅓ more space then the original data. When encoding data, a [CR, LF] (carriage-return and linefeed character pair) is inserted every 64 characters. These [CR, LF] character pairs are ignored when decoding data. Also, if the original data set does not contain an even multiple of three bytes, then padding bytes consisting of 0x00 are used to fill up the missing bytes. If a six-bit Base64 code contains nothing but padding bits, then the resulting Base64 data byte is "=". The resulting Base64 data set always contains a multiple of four bytes. When decoding data and the padding byte "=" is detected, the resulting six bit Base64 code is 0x00. Any resulting data byte that contains nothing but padding bits is not output.

This section describes the hardware-assisted text-rasterization engine 64. Text rasterization converts incoming packet data that is in ASCII format to a bitmap format. This bitmap format is then used for printing to specialized devices, such as an LCD screen or a printer. The text-rasterization engine 64 has two different rasterization modes, 8-bit ASCII and 16-bit character mode. A different font memory is supplied depending on which rasterization mode is used. If the hardware-assisted text-rasterization engine 64 is used in conjunction with the G3 engine 42, then the G3 engine 42 must be enabled prior to enabling the hardware-assisted text-rasterization engine 64.

This section describes the G3 encoder 42. The G3 encoder 42 takes output from the hardware-assisted text-rasterization engine 64, and Huffman encodes the data to put it in the proper format for fax transmission. A source memory address, which contains the rasterized data, and a target memory address, where the encoded data is stored, is programmed into the G3 encoder 42 prior to the start of each session.

This section describes the Mime string search engine 62. The Mime string search engine searches a buffer for specified character strings. It reports back the starting and ending offsets for the string, and is also capable of searching across multiple buffers. The Mime string search engine 62 can also automatically search a data buffer for the POP termination string: ([CR] [LF] [.] [CR] [LF]). This type of specialized data processing engine might equally well be used, for example, to insert or detect tags, markers, or perform framing in a streaming protocol such as TCP in order to convert such a streaming protocol into a block-based protocol.

This section describes the ADPCM accelerator engine 38. The ADPCM accelerator engine 38 provides 2:1 and 4:1 compression and decompression functions. The ADPCM accelerator engine 38 operates on a buffer of data in memory, and puts the compressed or decompressed data back to memory. For compression the source and destination memory addresses can be the same because the compressed data take less room than the original data.

Figure 8:
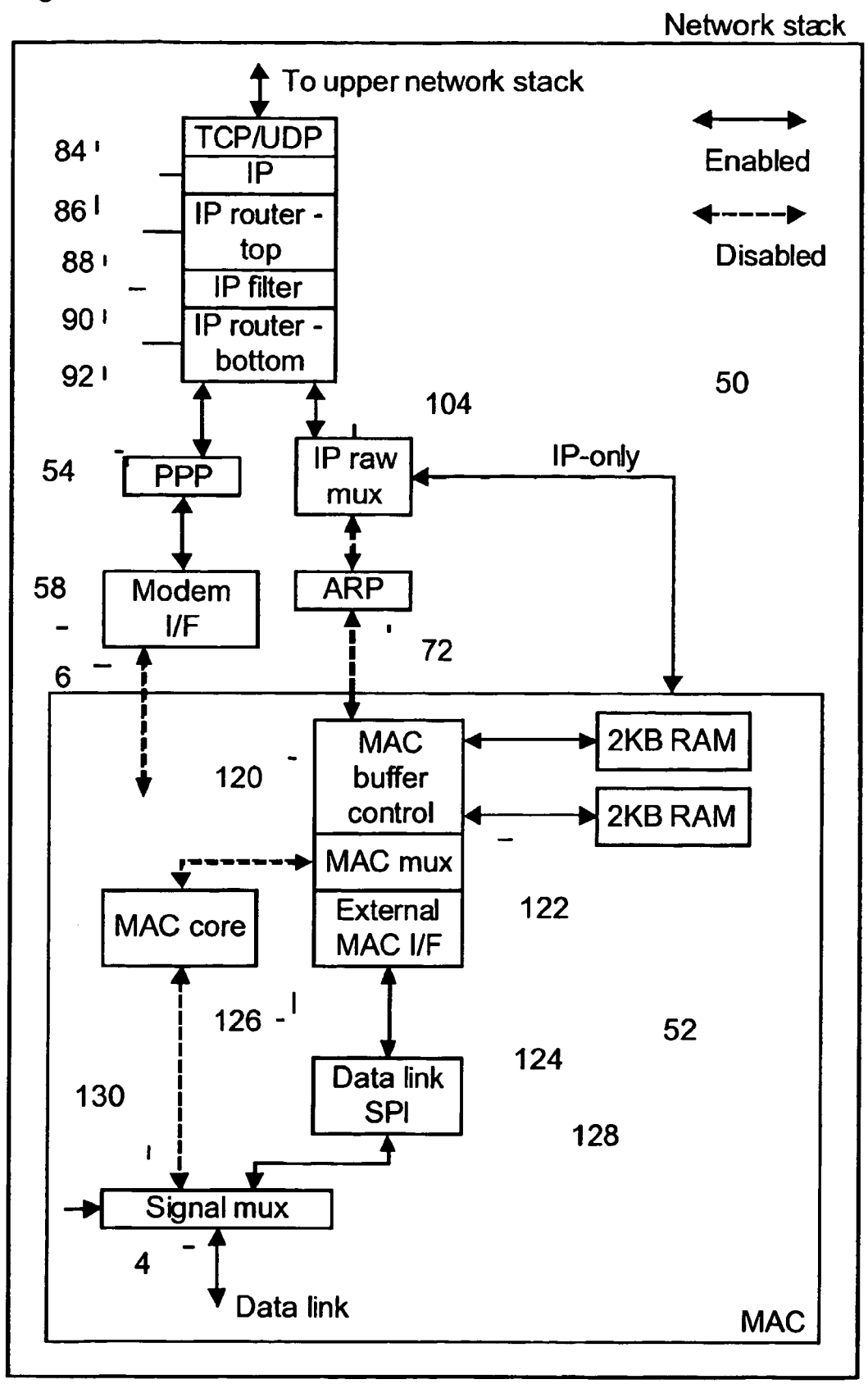
FIG. 8 is a block schematic diagram showing an IP-only mode data path according to the invention.

This section describes the IP-only mode of operation of the network stack 50. FIG. 8 is a block schematic diagram showing an IP-only mode data path according to the invention. The IP-only mode is provided so that non-Ethernet or non-PPP data links can be used. By default, the IP-only mode comes up disabled after resets. When the IP-only mode is enabled, both the Ethernet data link and the PPP data link are disabled. The data packets are tapped off at the IP raw mux 104. Therefore, the IP router—bottom engine 92 is configured to send all data out the Ethernet data link. The IP-only data still uses the MAC transmit and receive buffers 118. This prevents under-run conditions and allows for retransmission on bad packets. To set the source IP address for this mode, the system programs the local IP Address registers in the ARP engine 72. The IP-only transmit interface works through the data link SPI interface. The data format used for the IP packet starts with the IP header, and goes through the data field. No extra checksum or padding bytes are appended.

This section describes the data link SPI interface of the communications processor 10. The data link SPI interface is used when communicating using the IP-only mode or when using an external MAC. When the internal MAC is enabled, then the data link SPI interface is disabled. When receiving packets, only one data packet is stored in the receive buffer at a time. This only applies to packets that are made available to the protocol engine 34 because all data packets go to the network stack 50. If another non-data packet is received, but the previous packet is still in the data link SPI receive buffer, then the second packet is discarded.

This section describes the integrated test and debug features of the communications processor 10. Combined with an external CPU, microprocessor, or microcontroller 16, the debug features allow breaking on an address, and single stepping. The address comparison is made with the protocol engine 34 physical 20-bit address (1 MB memory space). Breaks can be triggered on either reads or writes, with each type of operation individually controlled. Two separate break-point addresses are provided for flexibility. All registers associated with the protocol engine 34 debugger are located in the protocol engine 34 miscellaneous index registers. The communications processor uses built-in self-test (BIST) to test the internal RAMs, scan testing for general fault coverage, and NAND-tree logic for parametric I/O testing. Four dedicated test pins are provided for the communications processor 10.

This section describes the clocking features of the communications processor 10. The communications processor 10 features a clocking mechanism that allows it to run the MAC buffers 118 (FIG. 3) at a higher clock frequency then the rest of the communications processor 10. In addition, the network stack logic 50 can be made to operate at a different clock frequency then the protocol engine 34. The protocol engine 34 may also slow itself down in order to conserve power during idle periods. The clocking logic also provides for a programmable clock output that can be used to drive system logic 18. (FIG. 1)

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for decoding and encoding network protocols and processing data, comprising:
   a network stack for receiving and transmitting packets and for encoding and decoding packets;
   one or more programmable protocol engines associated with said network stack; and
   at least one dedicated processing engine for offloading protocol processing and/or data processing;
   wherein said network stack comprises corresponding hardware structures that are implemented in gate-level circuitry and wherein such hardware structures are dedicated solely to performing functions of the network stack;
   wherein said apparatus operates in either of:
   a normal mode; and
   a CPU bypass mode;
   wherein when configured for CPU bypass mode, said one or more programmable protocol engines is disabled, and an external controller can communicate directly to said network stack via a register set.

2. The apparatus of claim 1,
   said at least one dedicated processing engine further for encoding, decoding, and processing packets;
   wherein said at least one dedicated processing engine comprises corresponding hardware structures that are implemented in gate-level circuitry and wherein such hardware structures are dedicated solely to performing functions of the processing engines.

3. A communications processor, comprising:
   a network stack, that both decodes and encodes any of multiple network protocols in a streaming manner concurrently, and that processes packet data in one pass;
   a programmable protocol engine associated with said communications processor for extending network stack functionality; and
   at least one dedicated processing engine for offloading protocol processing and/or data processing;
   wherein said communications processor operates in either of:
   a normal mode; and
   a CPU bypass mode;
   wherein when configured for CPU bypass mode, said programmable protocol engine is disabled, and an external controller can communicate directly to said network stack via a register set.

4. The communications processor of claim 3, further comprising:
   a hardware state machine, incorporated into said network stack, for any of optimized protocol processing and data processing.

5. The communications processor of claim 3, further comprising:
   a set of peripherals for said protocol engine;
   a network stack core;
   a set of data processing engines;
   an external controller interface;
   a memory interface; and
   a plurality of auxiliary serial ports.

6. The communications processor of claim 3, further comprising:
   one or more state machines, associated with said network stack for supporting any one or more of PPP, LAN, TCP/UDP, and IP protocols.

7. The communications processor of claim 3, further comprising:
   a plurality of generic sockets having send and receive buffers.

8. The communications processor of claim 3, further comprising:
   any of Ethernet and serial links.

9. The communications processor of claim 3, further comprising any of:
   an external controller interface;
   an SPI interface;
   a parallel interface;
   a direct data access mode;
   a serial modem interface;
   a dedicated port which allows one or more devices to use Internet connectivity in said network stack, wherein said one or more devices can connect to the Internet without requiring its own networking hardware or Internet physical connection;
   an auxiliary serial port;
   a memory interface for external memory;

an MII interface for 10/100 BT PHY;
a data link SPI interface for external MAC and raw IP modes; and
general purpose I/O pins.

10. The communications processor of claim 3, said programmable protocol engine further comprising any of:
ITU T.37 compatibility;
a Base64 accelerator;
a G3 and/or text rasterizer accelerators;
support transport of JPEG encoded color images;
MIME string search accelerator; and
ADPCM compression/decompression.

11. The communications processor of claim 3, wherein said programmable protocol engine supports any of an internal MAC and an external MAC.

12. The communications processor of claim 3, said programmable protocol engine further comprising:
means for supporting router functions.

13. The communications processor of claim 12, said programmable protocol engine further means for supporting router functions further comprising:
means for determining an appropriate source IP address to use in a data packet based upon a destination IP address; and
means for passing said source IP address back to a calling engine.

14. The communications processor of claim 12, said means for supporting router functions further comprising:
means for steering a transmitted packet to an appropriate data link based upon a destination IP address.

15. The communications processor of claim 3, further comprising:
an Internet protocol (IP) router engine for routing information.

16. The communications processor of claim 3, further comprising:
an address resolution protocol (ARP) engine for resolving an Ethernet hardware address from any given Internet protocol (IP) address and for automatic replies to valid ARP requests.

17. The communications processor of claim 3, further comprising:
a media access controller (MAC) module integrated into said network stack for enabling Ethernet access for devices.

18. The communications processor of claim 3, further comprising:
an internal protocol engine.

19. The communications processor of claim 3, further comprising:
an interface for communicating with any of the following peripherals:
a memory management unit (MMU);
a DMA controller (DMAC);
a timer;
an interrupt controller (INTC);
an integrated debugger;
a bus controller (BUSC); and
a watchdog timer (WATCH).

20. The communications processor of claim 3, further comprising:
a Base64 encoding module for transmitting binary data over Internet connections.

21. The communications processor of claim 3, further comprising:
a text rasterization module for converting incoming network data to a bitmap format.

22. The communications processor of claim 3, further comprising:
a G3 encoder for encoding data to format said data for a fax controller.

23. The communications processor of claim 3, further comprising:
a MIME string search engine.

24. The communications processor of claim 3, further comprising:
an ADPCM accelerator for providing compression and decompression functions.

25. A communications processor, comprising:
a network stack, that both decodes and encodes any of multiple network protocols in a streaming manner concurrently, and that processes packet data in one pass; and
a programmable protocol engine associated with said communications processor for extending network stack functionality;
wherein said network stack and said programmable protocol engine are integrated into a common gate cover hardware structure;
wherein said communications processor operates in either of:
a normal mode; and
a CPU bypass mode;
wherein when configured for CPU bypass mode, said programmable protocol engine is disabled, and an external controller can communicate directly to said network stack via a register set.

26. A communications processor, comprising:
a network stack, that both decodes and encodes any of multiple network protocols in a streaming manner concurrently, and that processes packet data in one pass; and
a programmable protocol engine associated with said communications processor for extending network stack functionality;
wherein said communications processor operates in either of:
a normal mode; and
a CPU bypass mode;
wherein when configured for CPU bypass mode, said programmable protocol engine is disabled, and an external controller can communicate directly to said network stack via a register set;
wherein when said programmable protocol engine is enabled, said external controller communicates via various registers.

27. A communications processor, comprising:
a network stack, that both decodes and encodes any of multiple network protocols in a streaming manner concurrently, and that processes packet data in one pass;
a programmable protocol engine associated with said communications processor for extending network stack functionality; and
a test index mode for allowing said programmable protocol engine to control said network stack while said programmable protocol engine is still enabled;
wherein said communications processor operates in either of:
a normal mode; and
a CPU bypass mode;
wherein when configured for CPU bypass mode, said programmable protocol engine is disabled, and an external controller can communicate directly to said network stack via a register set.

28. A communications processor, comprising:
a network stack, that both decodes and encodes any of multiple network protocols in a streaming manner concurrently, and that processes packet data in one pass; and
a programmable protocol engine associated with said communications processor for extending network stack functionality, and comprising an IP filter for supporting NAT and IP masquerading;
wherein said communications processor operates in either of:
a normal mode; and
a CPU bypass mode;
wherein when configured for CPU bypass mode, said programmable protocol engine is disabled, and an external controller can communicate directly to said network stack via a register set.

29. The communications processor of claim 28, said programmable protocol engine further comprising:
means for supporting forwarding functions, further comprising the ability to substitute packet parameters, recalculate checksums, and either receive a packet or forward the packet out to the network.

30. An apparatus for augmenting functionality of a network stack, implemented in gate level circuitry, and dedicated solely to performing network stack functions that both decodes and encodes multiple network protocols in a streaming manner concurrently, and that processes packet data in one pass, said apparatus comprising:
a protocol engine, associated with a network stack for implementing communications functionality in addition to that of said network stack concurrently with said network stack performing protocol operations; and
at least one dedicated processing engine for offloading protocol processing and/or data processing;
wherein said apparatus operates in either of:
a normal mode; and
a CPU bypass mode;
wherein when configured for CPU bypass mode, said protocol engine is disabled, and an external controller can communicate directly to said network stack via a register set.

31. A method for decoding and encoding network protocols and data, comprising:
providing a network stack for receiving and transmitting network packets and for encoding and decoding network packet bytes which comprise packet data;
providing at least one data processing engine that is optimized for one or more application protocols;
providing at least one state machine module that is optimized for one or more network protocols;
providing a programmable protocol engine for extending said network stack functionality; and
providing at least one dedicated processing engine for offloading protocol processing and/or data processing;
wherein said network stack, said data processing engine, said state machine module, and said protocol engine comprise corresponding hardware structures that are implemented in gate level circuitry;
wherein said method operates in either of:
a normal mode; and
a CPU bypass mode;
wherein when configured for CPU bypass mode, said programmable protocol engine is disabled, and an external controller can communicate directly to said network stack via a register set.

32. A communications method, comprising:
providing a network stack that both decodes and encodes multiple network protocols in a streaming manner concurrently, and that processes packet data in one pass;
providing a set of data processing engines which are optimized to application data processing; and
providing a programmable protocol engine, integrated in a common gate level hardware structure with said network stack, for extending functionality of said network stack and said data processing engines;
wherein said communications method operates in either of:
a normal mode; and
a CPU bypass mode;
wherein when configured for CPU bypass mode, said programmable protocol engine is disabled, and an external controller can communicate directly to said network stack via a register set; and
wherein when said programmable protocol engine is enabled, said external controller communicates via various registers.

33. The communications method of claim 32, further comprising:
providing a set of peripherals for said protocol engine;
providing a network stack core;
providing an external controller interface;
providing a set of data processing engines;
providing a memory interface; and
providing a plurality of auxiliary serial ports.

34. The communications method of claim 32, further comprising:
providing at least one network stack state machine for supporting at least one of PPP, LAN, TCP/UDP, and IP protocols.

35. The communications method of claim 32, further comprising:
providing a plurality of generic sockets having send and receive buffers.

36. The communications method of claim 32, further comprising:
providing any of Ethernet and serial links.

37. The communications method of claim 32, further comprising:
providing any of:
an external controller interface;
an SPI interface;
a parallel interface;
a direct data access mode;
a serial modem interface;
a dedicated port which allows one or more devices to use Internet connectivity in said network stack, wherein said one or more devices can connect to the Internet without requiring its own networking hardware or Internet physical connection;
an auxiliary serial port;
a memory interface for external memory;
an MII interface for 10/100 BT PHY;
a data link SPI interface for external MAC and raw IP modes; and
general purpose I/O pins.

38. The communications method of claim 32, said providing said protocol engine further comprising providing any of:

ITU T.37 compatibility;
a Base64 accelerator;
a G3 and/or text rasterizer accelerators;
support transport of JPEG encoded color images;
MIME string search accelerator; and
ADPCM compression/decompression.

39. The communications method of claim 32, wherein said protocol engine supports any of an internal MAC and an external MAC.

40. The communications method of claim 32, further comprising:
providing an Internet protocol (IP) router engine for routing information.

41. The communications method of claim 32, further comprising:
providing an address resolution protocol (ARP) engine for resolving air Ethernet hardware address from any given Internet protocol (IP) address, and for generating automatic replies to valid ARP requests.

42. The communications method of claim 32, further comprising:
providing a media access controller (MAC) module integrated into said network stack for enabling Ethernet access for devices.

43. The communications method of claim 32, further comprising:
providing an internal protocol engine.

44. The communications method of claim 32, further comprising:
providing an interface for communicating with any of the following peripherals:
a memory management unit (MMU);
a DMA controller (DMAC);
a timer;
an interrupt controller (INTC);
an integrated debugger;
a bus controller (BUSC); and
a watchdog timer (WATCH).

45. The communications method of claim 32, further comprising:
providing a Base64 encoding module for transmitting binary data over Internet connections.

46. The communications method of claim 32, further comprising:
providing a text rasterization module for converting incoming network data to a bitmap format.

47. The communications method of claim 32, further comprising:
providing a G3 encoder for encoding data in a proper format for a fax controller.

48. The communications method of claim 32, further comprising:
providing a MIME string search engine.

49. The communications method of claim 32, further comprising:
providing an ADPCM accelerator for providing compression and decompression functions.

50. The communications method of claim 32, further comprising:
providing a master SPI port.

51. The communications method of claim 32, further comprising:
providing battery backed internal RAM for said protocol engine for non-volatile data or code storage.

52. The communications method of claim 32, further comprising:
providing means for said programmable protocol engine regulating its own clock frequency based upon current activities to conserve power.

53. A communications method, comprising:
providing a network stack that both decodes and encodes multiple network protocols in a streaming manner concurrently, and that processes packet data in one pass;
providing a set of data processing engines which are optimized to application data processing;
providing a programmable protocol engine, integrated in a common gate level hardware structure with said network stack, for extending functionality of said network stack and said data processing engines; and
providing a test index mode for allowing said programmable protocol engine to control said network stack while said programmable protocol engine is still enabled;
wherein said communications method operates in either of:
a normal mode; and
a CPU bypass mode;
wherein when configured for CPU bypass mode, said programmable protocol engine is disabled, and an external controller can communicate directly to said network stack via a register set.

54. A communications method, comprising:
providing a network stack that both decodes and encodes multiple network protocols in a streaming manner concurrently, and that processes packet data in one pass;
providing a set of data processing engines which are optimized to application data processing;
providing a programmable protocol engine, integrated in a common gate level hardware structure with said network stack, for extending functionality of said network stack and said data processing engines; and
providing an IP filter for supporting NAT and IP masquerading;
wherein said communications method operates in either of:
a normal mode; and
a CPU bypass mode;
wherein when configured for CPU bypass mode, said programmable protocol engine is disabled, and an external controller can communicate directly to said network stack via a register set.

55. A method for augmenting functionality of a network stack that both decodes and encodes multiple network protocols in a streaming manner concurrently, and that processes packet data in one pass, said method comprising:
providing a programmable protocol engine, integral to a network stack, and for concurrently extending functionality of said network stack;
implementing said programmable protocol engine in a hardware structure that comprises a common gate level circuitry with said network stack; and
providing at least one dedicated processing engine for offloading protocol processing and/or data processing;
wherein said method operates in either of:
a normal mode; and
a CPU bypass mode;
wherein when configured for CPU bypass mode, said programmable protocol engine is disabled, and an external controller can communicate directly to said network stack via a register set.

56. A communications method, comprising:
providing a network stack that both decodes and encodes multiple network protocols in a streaming manner concurrently, and that processes packet data in one pass;
providing a set of data processing engines which are optimized to application data processing;
providing a programmable protocol engine, integrated in a common gate level hardware structure with said network stack, for extending functionality of said network stack and said data processing engines; and
providing a separate PPP buffer to enable said network stack to process data from either a LAN or serial interfaces at the same speed;
wherein said communications method operates in either of:
a normal mode; and
a CPU bypass mode;
wherein when configured for CPU bypass mode, said programmable protocol engine is disabled, and an external controller can communicate directly to said network stack via a register set.

57. A communications method, comprising:
providing a network stack that both decodes and encodes multiple network protocols in a streaming manner concurrently, and that processes packet data in one pass;
providing a set of data processing engines which are optimized to application data processing;
providing a programmable protocol engine, integrated in a common gate level hardware structure with said network stack, for extending functionality of said network stack and said data processing engines; and
providing a raw IP data path for connecting to any arbitrary data link;
wherein said communications method operates in either of:
a normal mode; and
a CPU bypass mode;
wherein when configured for CPU bypass mode, said programmable protocol engine is disabled, and an external controller can communicate directly to said network stack via a register set.

58. A method, comprising:
providing at least one data processing engine for processing one or more application protocols;
providing at least one state machine module for processing one or more network protocols;
providing a programmable protocol engine for extending functionality; and
providing at least one dedicated processing engine for offloading protocol processing and/or data processing;
wherein said data processing engine, said state machine module, and said protocol engine comprise corresponding hardware structures that are implemented in gate level circuitry;
wherein said method operates in either of:
a normal mode; and
a CPU bypass mode;
wherein when configured for CPU bypass mode, said programmable protocol engine is disabled, and an external controller can communicate directly to a network stack via a register set.

59. A communications processor, comprising:
a network stack that both decodes and encodes multiple network protocols in a streaming manner concurrently, and that processes packet data in one pass;
a set of data processing engines which are optimized to application data processing;
a programmable protocol engine, integrated in a common gate level hardware structure with said network stack, for extending functionality of said network stack and said data processing engines; and
a separate PPP buffer to enable said network stack to process data from either a LAN or serial interfaces at the same speed;
wherein said communications processor operates in either of:
a normal mode; and
a CPU bypass mode;
wherein when configured for CPU bypass mode, said programmable protocol engine is disabled, and an external controller can communicate directly to said network stack via a register set.

60. A communications processor, comprising:
a network stack that both decodes and encodes multiple network protocols in a streaming manner concurrently, and that processes packet data in one pass;
a set of data processing engines which are optimized to application data processing;
a programmable protocol engine, integrated in a common gate level hardware structure with said network stack, for extending functionality of said network stack and said data processing engines; and
a raw IP data path for connecting to any arbitrary data link;
wherein said communications processor operates in either of:
a normal mode; and
a CPU bypass mode;
wherein when configured for CPU bypass mode, said programmable protocol engine is disabled, and an external controller can communicate directly to said network stack via a register set.

61. A communications processor, comprising:
a network stack for receiving and transmitting network packets and for encoding and decoding network packet bytes which comprise packet data;
at least one data processing engine that is optimized for one or more application protocols;
at least one state machine module that is optimized for one or more network protocols;
a programmable protocol engine for extending said network stack functionality; and
at least one dedicated processing engine for offloading protocol processing and/or data processing;
wherein said network stack, said data processing engine, said state machine module, and said protocol engine comprise corresponding hardware structures that are implemented in gate level circuitry;
wherein said communications processor operates in either of:
a normal mode; and
a CPU bypass mode;
wherein when configured for CPU bypass mode, said programmable protocol engine is disabled, and an external controller can communicate directly to said network stack via a register set.

62. A communications processor, comprising:
providing at least one data processing engine for processing one or more application protocols;
at least one state machine module for processing one or more network protocols;

a programmable protocol engine for extending functionality; and at least one dedicated processing engine for offloading protocol processing and/or data processing;

wherein said data processing engine, said state machine module, and said protocol engine comprise corresponding hardware structures that are implemented in gate level circuitry;

wherein said communications processor operates in either of:

a normal mode; and a CPU bypass mode;

wherein when configured for CPU bypass mode, said programmable protocol engine is disabled, and an external controller can communicate directly to a network stack via a register set.

* * * * *

UNITED STATES PATENT AND TRADEMARK OFFICE
CERTIFICATE OF CORRECTION

| | | |
|---|---|---|
| PATENT NO. | : 7,379,475 B2 | Page 1 of 1 |
| APPLICATION NO. | : 10/470365 | |
| DATED | : May 27, 2008 | |
| INVENTOR(S) | : Minami et al. | |

It is certified that error appears in the above-identified patent and that said Letters Patent is hereby corrected as shown below:

In the claims:
Col. 31, line 17, please replace "air" with --an--.

Signed and Sealed this
Twenty-fourth Day of May, 2011

David J. Kappos
*Director of the United States Patent and Trademark Office*